US010329441B2

(12) United States Patent
Hattori et al.

(10) Patent No.: US 10,329,441 B2
(45) Date of Patent: Jun. 25, 2019

(54) AQUEOUS PIGMENT DISPERSION, PIGMENT DISPERSANT, AND CORE-SHELL POLYMER PARTICLES

(71) Applicant: DIC Corporation, Tokyo (JP)

(72) Inventors: Mariko Hattori, Sakura (JP); Yukie Uemura, Takaishi (JP); Masahiko Asada, Sakura (JP); Hisakazu Tanaka, Takaishi (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 15/032,891

(22) PCT Filed: Nov. 27, 2014

(86) PCT No.: PCT/JP2014/081447
§ 371 (c)(1),
(2) Date: Apr. 28, 2016

(87) PCT Pub. No.: WO2015/087710
PCT Pub. Date: Jun. 18, 2015

(65) Prior Publication Data
US 2016/0251524 A1    Sep. 1, 2016

(30) Foreign Application Priority Data

Dec. 10, 2013  (JP) ................................ 2013-255020

(51) Int. Cl.
| C09D 7/65 | (2018.01) |
| C09D 11/322 | (2014.01) |
| B41J 2/01 | (2006.01) |
| C08F 8/12 | (2006.01) |
| C09D 11/326 | (2014.01) |
| C08F 297/02 | (2006.01) |
| C09D 17/00 | (2006.01) |
| C09D 11/106 | (2014.01) |
| C09B 67/46 | (2006.01) |
| C09D 11/107 | (2014.01) |
| C09D 7/45 | (2018.01) |
| C09D 5/00 | (2006.01) |

(52) U.S. Cl.
CPC ............... *C09D 11/322* (2013.01); *B41J 2/01* (2013.01); *C08F 8/12* (2013.01); *C08F 297/02* (2013.01); *C09B 67/009* (2013.01); *C09D 5/00* (2013.01); *C09D 7/45* (2018.01); *C09D 11/106* (2013.01); *C09D 11/107* (2013.01); *C09D 11/326* (2013.01); *C09D 17/00* (2013.01)

(58) Field of Classification Search
None
See application file for complete search history.

(56) References Cited

U.S. PATENT DOCUMENTS

| 5,085,698 A | 2/1992 | Ma et al. |
| 5,221,334 A | 6/1993 | Ma et al. |
| 5,272,201 A | 12/1993 | Ma et al. |
| 5,288,826 A | 2/1994 | Yamamoto et al. |
| 5,541,261 A | 7/1996 | Fock et al. |
| 5,760,124 A | 6/1998 | Listigovers et al. |
| 7,812,067 B2 | 10/2010 | Doumaux et al. |
| 2005/0075418 A1 | 4/2005 | Nishiguchi |
| 2007/0232723 A1 | 10/2007 | Arakawa |
| 2008/0094457 A1 | 4/2008 | Doumaux et al. |
| 2011/0166282 A1 | 7/2011 | Dire et al. |
| 2011/0223529 A1 | 9/2011 | Shimanaka et al. |
| 2012/0050391 A1 | 3/2012 | Nishiguchi et al. |

FOREIGN PATENT DOCUMENTS

| CN | 1651525 A | 8/2005 |
| EP | 0819738 A2 | 1/1998 |
| EP | 1193301 A1 | 4/2002 |
| EP | 2330154 A1 | 6/2011 |
| EP | 3031838 A1 | 6/2016 |
| JP | 5-214031 A | 8/1993 |
| JP | 6-136311 A | 5/1994 |
| JP | 7-224112 A | 8/1995 |
| JP | 8-183920 A | 7/1996 |
| JP | 10-7955 A | 1/1998 |
| JP | 10-182707 A | 7/1998 |
| JP | 2005-133089 A | 5/2005 |
| JP | 2005-194487 A | 7/2005 |
| JP | 2006-083277 A | 3/2006 |
| JP | 2007-238949 A | 9/2007 |
| JP | 2007-262326 A | 10/2007 |
| JP | 2008-195769 A | 8/2008 |
| JP | 2008-208153 A | 9/2008 |
| JP | 2010-180353 A | 8/2010 |
| JP | 2011-521065 A | 7/2011 |
| JP | 2012-072356 A | 4/2012 |
| JP | 2013-993 A | 1/2013 |
| WO | 2010/013651 A1 | 2/2010 |

OTHER PUBLICATIONS

Machine translation of JP 2008-195769, 2008.*
Machine translation of JP2010180353. (Year: 2010).*
International Search Report dated Mar. 3, 2015, issued in counterpart International Application No. PCT/JP2014/081447 (2 pages).
Search Report dated Feb. 3, 2015, issued in International Application No. PCT/JP2014/078899.
Gradzielski et al., "Small-Angle Neutron Scattering from Diffuse Interfaces. 2. Polydisperse Shells in Water-n-Alkane-C10E4 Microemulsions", Journal of Physical Chemistry, 1995, pp. 13232-13238.

(Continued)

*Primary Examiner* — Wenwen Cai
(74) *Attorney, Agent, or Firm* — Westerman, Hattori, Daniels & Adrian, LLP

(57) ABSTRACT

There is provided a pigment dispersant that is a block polymer P in which a hydrophobic polymer block A and a hydrophilic polymer block B containing an anionic group are linked to each other. The block polymer P has a number average molecular weight ranging from 1000 to 4000; and where the block polymer P is subjected to 100% neutralization of the anionic group with a basic compound and dispersed in water and where the fine particles of the dispersed block polymer P are subjected to measurement of a scattering profile by small- or ultra-small-angle X-ray scattering that involves use of synchrotron radiation, at least one minimum value in the scattering profile is present within the range of a scattering vector q from 0.1 to 1 $nm^{-1}$. There is also provided an aqueous pigment dispersion containing the pigment dispersant, a pigment, a basic compound, and an aqueous medium.

8 Claims, 3 Drawing Sheets

(56) References Cited

OTHER PUBLICATIONS

Liu et al., "Synthesis and Dispersion Properties of Block Copolymer PS-b-PAA", Journal of Beijing Technology and Business University, vol. 24 No. 1, 2006, pp. 5-9, with translation.
Heinen et al., "Phase Behavior of Amphiphilic Diblock Co-oligomers with Nonionic and Ionic Hydrophilic Groups", The Journal of Physical Chemistry, vol. 117, No. 10, 2013, pp. 3005-3018.
Ganeva et al., "Particle Formation in ab Initio RAFT Mediated Emulsion Polymerization Systems", Macro molecules, vol. 40, No. 17, 2007, pp. 6181-6189.
Final Office Action dated Aug. 23, 2017, issued in U.S. Appl. No. 15/035,007.
Final Office Action dated May 4, 2017, issued in U.S. Appl. No. 15/035,007.
Non-Final Office Action dated Jan. 23, 2017, issued in U.S. Appl. No. 15/035,007.

* cited by examiner

[FIG. 1]
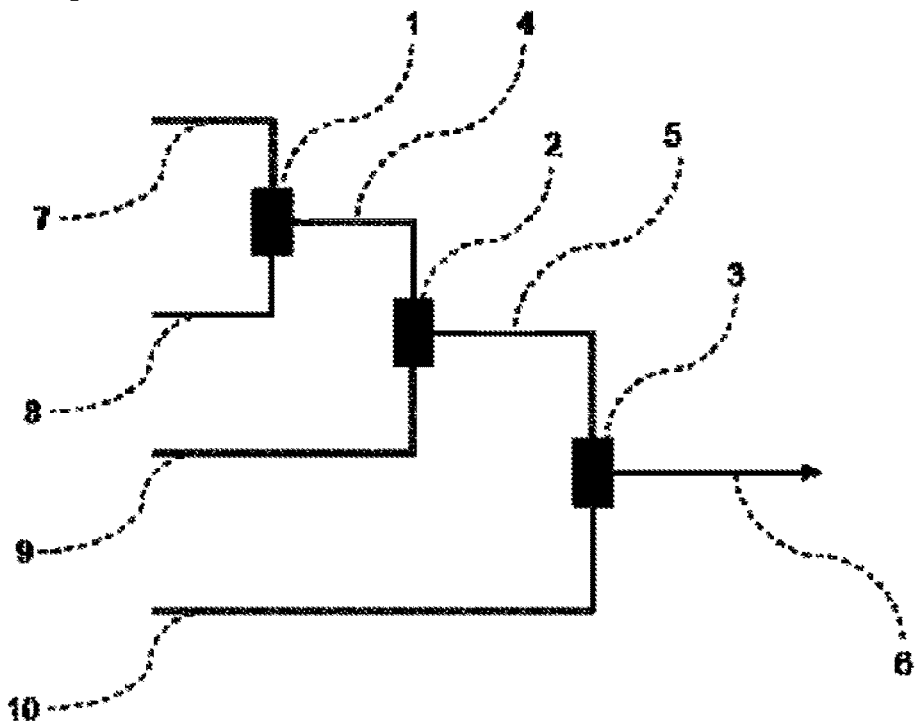
[FIG. 2]
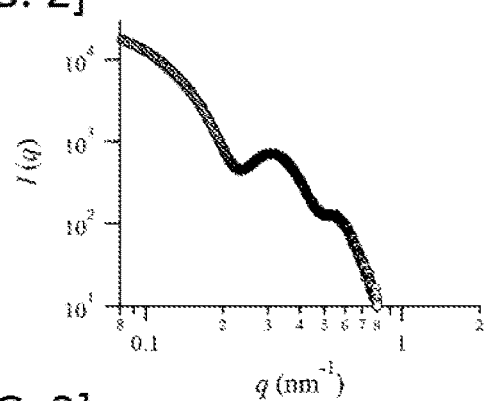
[FIG. 3]
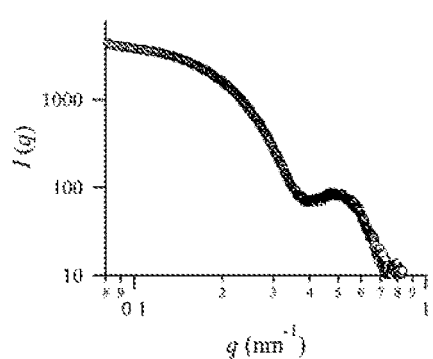

[FIG. 4]
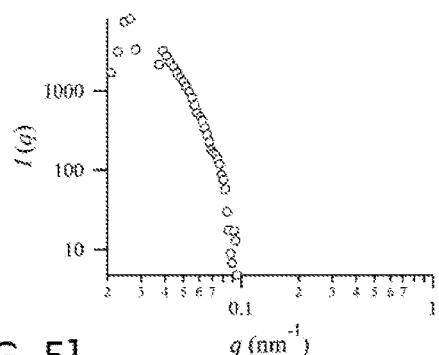
[FIG. 5]
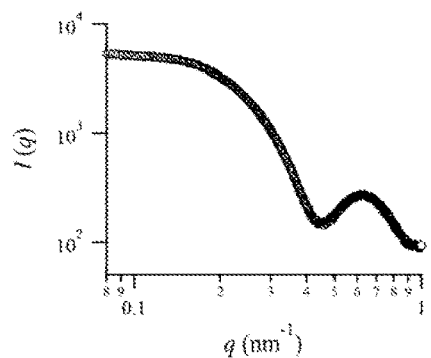
[FIG. 6]
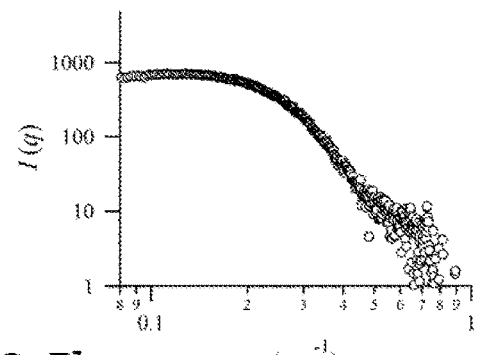
[FIG. 7]
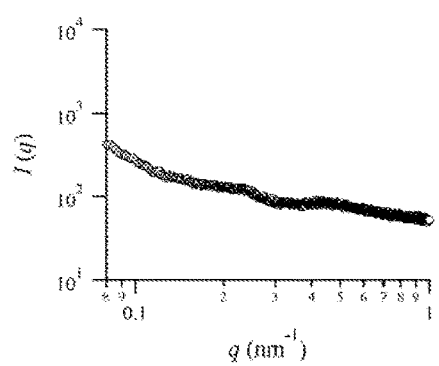

[FIG. 8]
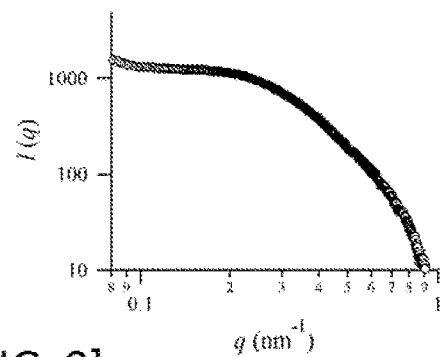
[FIG. 9]
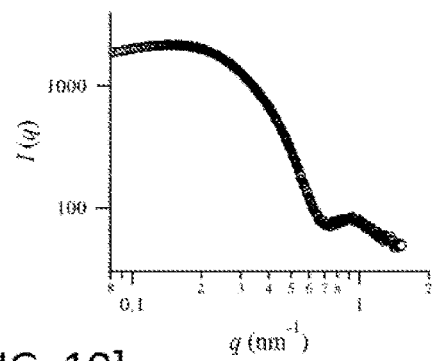
[FIG. 10]
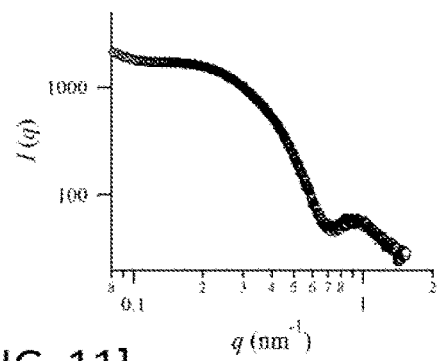
[FIG. 11]
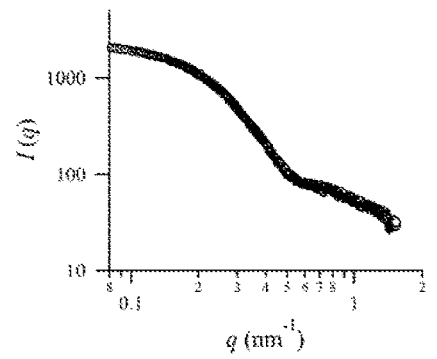

AQUEOUS PIGMENT DISPERSION, PIGMENT DISPERSANT, AND CORE-SHELL POLYMER PARTICLES

TECHNICAL FIELD

The present invention relates to a pigment dispersant and an aqueous resin dispersion containing the pigment dispersant.

BACKGROUND ART

Ink-jet recording has been used in a wider range of applications than before; it is used at home, at office, for photography, and out of doors. Printed matters therefore need to have a weather resistance (light resistance) and a storability. In ink-jet recording, dyes have been mainly used as colorants; however, they have problems in terms of light resistance, and thus aqueous ink-jet recording inks in which pigments having a good light resistance are used have been developed.

Since pigments are water-insoluble, techniques for stably dispersing them in aqueous media are necessary. In a known one of such techniques, a pigment is coated with a self-water-dispersible resin in which some of acid groups have been neutralized with basic groups, such as a styrene-(meth) acrylic-acid-based copolymer in which some of (meth) acrylic acid groups have been neutralized; and this pigment is dispersed and diluted with an aqueous medium (for instance, see Patent Literature 1). Such a pigment dispersion using the resin dispersant, however, generates coarse particles in some cases.

Coarse particles are particles having a particle size so much larger than the average particle size of an obtained aqueous pigment dispersion, and they are speculated to be formed by non-dispersion of a pigment, agglomeration of a pigment that has been dispersed but broken, or agglomeration of a polymer to be used as the pigment dispersant.

Such coarse particles prevent formation of the even surface of a coating film in painting and printing and cause nozzle clogging of an ink-jet head in printing in which an ink, such as an aqueous ink-jet recording ink, is ejected from the nozzle. In particular, as ink-jet printers have become more high-resolution these days, the nozzles of an ink-jet head are arranged at higher density, and finer liquid droplets are ejected, in other words, the nozzles for ejecting ink each have a smaller diameter and are more integrated (for example, see Patent Literature 2). As the diameter of nozzles becomes smaller, the acceptable size of foreign objects becomes smaller; as a result, nozzle clogging is more likely to be caused, and thus inks that have been able to be used in typical ink-jet printers cannot be used in a new printer that has been developed to have a high-resolution ink-jet head, which is problematic. Accordingly, a reduction in coarse particles is necessary in applications to high-resolution ink-jet printers.

In a known technique for reducing generation of coarse particles having a large particle size, for example, a block polymer compound having a hydrophobic segment and a hydrophilic segment including a hydrophobic unit and hydrophilic unit is used as a pigment dispersant (for instance, see Patent Literature 3). In the block polymer compound disclosed in Patent Literature 3, the hydrophobic segment, which consists of the hydrophobic unit, as a repeating unit and the hydrophobic unit and hydrophilic unit as a repeating unit form a random copolymer structure or a gradient structure; the hydrophobic segment is oriented to be inside in an aqueous solvent, so that a micelle in which a hydrophilic shell is disposed around a hydrophobic core is formed; in the case where a liquid composition in which the block polymer compound having such a structure is dispersed is applied to a recording medium by an ink-jet technique and where the surface of the recording medium is observed with, for example, an electron microscope, coarse particles are not found; and in the case where a liquid composition in which a block polymer compound having a hydrophobic segment and a hydrophilic segment consisting of only a hydrophilic unit is dispersed is used, spherical coarse particles having a diameter of approximately 100 nm are found.

Coarse particles are, however, generated even with the technique disclosed in Patent Literature 3 in some cases. In addition, Patent Literature 3 does not refer to a reduction in the absolute number of coarse particles at all.

CITATION LIST

Patent Literature

PTL 1: Japanese Unexamined Patent Application Publication No. 2007-238949
PTL 2: Japanese Unexamined Patent Application Publication No. 2013-993
PTL 3: Japanese Unexamined Patent Application Publication No. 2008-195769

Non Patent Literature

NPL 1: M. Gradzielski "Small-Angle Neutron Scattering from Diffuse Interface"
NPL 2: "Polydisperse Shells in Water-n-Alkane-C10E4 Microemulsions", The Journal of Physical Chemistry; American Chemical Society, Aug. 1, 1995; pp 13232 to 13238

SUMMARY OF INVENTION

Technical Problem

It is an object of the present invention to provide a pigment dispersant that enables a pigment to be well dispersed and the absolute number of coarse particles to be reduced, an aqueous pigment dispersion using such a pigment dispersant, and core-shell fine polymer particles that can be used as a pigment dispersant.

Solution to Problem

The inventors have found the following: in the case where a block polymer having a number average molecular weight in a specific range is subjected to measurement of a scattering profile in water by small- or ultra-small-angle X-ray scattering that involves use of synchrotron radiation and where at least one minimum value in the scattering profile is present within the range of a scattering vector q from 0.1 to 1 nm-1 in the profile, this block polymer enables a pigment to be well dispersed and the absolute number of coarse particles to be reduced.

The presence of such a minimum value shows that the block polymer in water is in the form of core-shell polymer particles having a difference in density between the core and the shell. It is believed that the polymer used in the present invention is a block polymer in which a hydrophobic polymer block A is linked to a hydrophilic polymer block B having an anionic group and is in the form of particles having a structure in which the hydrophobic polymer block A is inside and in which the hydrophilic polymer block B is outside.

The inventors have found the following: among block polymers typically known as pigment dispersants, polymer particles that can be a core-shell type in which a minimum value is present in the above-mentioned manner in water particularly enables a reduction in the absolute number of coarse particles.

In particular, the present invention provides a pigment dispersant that is a block polymer P in which a hydrophobic polymer block A and a hydrophilic polymer block B containing an anionic group are linked to each other, wherein the block polymer P has a number average molecular weight ranging from 1000 to 4000; and in the case where the block polymer P is subjected to 100% neutralization of the anionic group with a basic compound and dispersed in water and where the fine particles of the dispersed block polymer P are subjected to measurement of a scattering profile by small- or ultra-small-angle X-ray scattering that involves use of synchrotron radiation, at least one minimum value in the scattering profile is present within the range of a scattering vector q from 0.1 to 1 $nm^{-1}$.

Furthermore, the present invention also provides an aqueous pigment dispersion containing such a pigment dispersant, a pigment, a basic compound, and an aqueous medium.

Moreover, the present invention also provides core-shell polymer particles containing a block polymer P in which a hydrophobic polymer block A and a hydrophilic polymer block B containing an anionic group are linked to each other, wherein the block polymer P has a number average molecular weight ranging from 1000 to 4000; and in the case where the block polymer P is subjected to measurement of a scattering profile by small- or ultra-small-angle X-ray scattering that involves use of synchrotron radiation, at least one minimum value in the scattering profile is present within the range of a scattering vector q from 0.1 to 1 $nm^{-1}$.

Advantageous Effects of Invention

The present invention enables production of an aqueous pigment dispersion which enables a pigment to be well dispersed and in which the absolute number of coarse particles is reduced.

DESCRIPTION OF EMBODIMENTS (Block Polymer P)

A block polymer P that is the pigment dispersant of the present invention is a polymer including a hydrophobic polymer block A and a hydrophilic polymer block B and having a number average molecular weight ranging from 1000 to 4000. The term "hydrophobic polymer block A" refers to a polymer block having a non-polar group such as an alkyl group with a chain or ring structure or an aromatic group, and the term "hydrophilic polymer block B" refers to a polymer block having a polar group such as an anionic group or cationic group.

The block polymer P used in the present invention is a polymer having a molecular structure of a block A-block B in which one end of the polymer block A is directly linked to one end of the polymer block B by covalent bond or in which these polymer blocks are linked to each other via a linking group (such a polymer is herein referred to as "block polymer"). It is preferably a vinyl polymer in view of the flexibility of design.

The polymer block A is not particularly limited provided that it is hydrophobic and may be either a homopolymer or a copolymer. Likewise, the polymer block B is not particularly limited provided that it is hydrophilic and may be either a homopolymer or a copolymer. A preferred example of the polymer block A is a hydrophobic polymer block having an aromatic ring or heterocycle, and a preferred example of the polymer block B is a hydrophilic polymer block having an anionic group neutralized with a basic compound.

The number average molecular weight of the block polymer P used in the present invention is in the range of 1000 to 4000. In the case where a pigment dispersion contains a pigment dispersant that is in the form of core-shell polymer particles which have a number average molecular weight in such a range and which are subjected to measurement of a scattering profile by small- or ultra-small-angle X-ray scattering that involves use of synchrotron radiation to show at least one minimum value in the scattering profile within the range of a scattering vector q from 0.1 to 1 nm-1, the number of coarse particles is reduced, although the mechanism that brings this effect has been still studied. This effect of the present invention is not produced in the case where a minimum value is present in such a manner but the average molecular weight of a polymer is out of the range or the case where the number average molecular weight of a polymer is in the above-mentioned range but a minimum value is not present in that manner.

The number average molecular weight is measured by GPC (gel permeation chromatography) in terms of polystyrene in the present invention; in particular, it is measured as follows.

(Measurement of Number Average Weight (Mn))

The number average molecular weight is measured by gel permeation chromatography (GPC) in the following manner.
Measurement Apparatus: High-performance GPC apparatus ("HLC-8220GPC" manufactured by TOSOH CORPORATION)
Column: The following columns manufactured by TOSOH CORPORATION are used and connected to each other in series
    "TSKgel G5000" (7.8 mm I.D.×30 cm): one
    "TSKgel G4000" (7.8 mm I.D.×30 cm): one
    "TSKgel G3000" (7.8 mm I.D.×30 cm): one
    "TSKgel G2000" (7.8 mm I.D.×30 cm): one
Detector: RI (refractive index) detector
Column temperature: 40° C.
Eluent: Tetrahydrofuran (THF)
Flow rate: 1.0 mL/min
Input: 100 µL (THF solution having a sample concentration of 0.4 mass %)
Standard sample: Calibration curves are defined with the following standard polystyrenes.
(Standard Polystyrene)
    "TSKgel standard polystyrene A-500" manufactured by TOSOH CORPORATION
    "TSKgel standard polystyrene A-1000" manufactured by TOSOH CORPORATION
    "TSKgel standard polystyrene A-2500" manufactured by TOSOH CORPORATION
    "TSKgel standard polystyrene A-5000" manufactured by TOSOH CORPORATION
    "TSKgel standard polystyrene F-1" manufactured by TOSOH CORPORATION
    "TSKgel standard polystyrene F-2" manufactured by TOSOH CORPORATION
    "TSKgel standard polystyrene F-4" manufactured by TOSOH CORPORATION "TSKgel standard polystyrene F-10" manufactured by TOSOH CORPORATION "TSKgel standard polystyrene F-20" manufactured by TOSOH CORPORATION "TSKgel standard polystyrene F-40" manufactured by TOSOH CORPORATION "TSKgel standard polystyrene F-80" manufactured by TOSOH CORPORATION "TSKgel standard polystyrene F-128" manufactured by TOSOH CORPORATION "TSKgel standard polystyrene F-288" manufactured by TOSOH CORPORATION "TSKgel standard polystyrene F-550" manufactured by TOSOH CORPORATION The block polymer P is used as a pigment dispersant for dispersing a pigment in a water medium or an aqueous medium such as a water-soluble organic solvent. An example in which an aqueous medium is used is described.

The polymer block A of the block polymer P is hydrophobic; hence, it is easily adsorbed by a pigment in an aqueous medium and serves for appropriate balance of solubility. Specific examples of the polymer block A includes polymer blocks having repeating units of compounds having hydrophobic groups such as alkyl groups, e.g., a methyl group, an ethyl group, and a butyl group, for instance, an isobutyl group or a t-butyl group; cycloalkyl groups, e.g., a cyclohexyl group; and aromatic groups, e.g., a phenyl group, a biphenyl group, and a naphthyl group. In the case where the block polymer P is a vinyl polymer, the compound that composes the polymer block A is preferably a vinyl monomer having a hydrophobic group such as an alkyl group, e.g., a methyl group, an ethyl group, or a butyl group, for instance, an isobutyl group or a t-butyl group; a cycloalkyl group, e.g., a cyclohexyl group; or an aromatic group, e.g., a phenyl group, a biphenyl group, or a naphthyl group.

Specific examples of the vinyl monomer that composes the polymer block A include (meth)acrylate monomers that are (meth)acrylate-based monomers, such as methyl (meth) acrylate, ethyl (meth)acrylate, propyl (meth)acrylate, isobutyl (meth)acrylate, t-butyl (meth)acrylate, hexyl (meth)acrylate, 2-ethylhexyl (meth)acrylate, octyl (meth)acrylate, lauryl (meth)acrylate, stearyl (meth)acrylate, phenyl (meth)acrylate, hydroxyethyl (meth)acrylate, hydroxypropyl (meth)acrylate, 2-ethoxyethyl (meth)acrylate, methacrylonitrile, 2-trimethylsiloxyethyl (meth)acrylate, glycidyl (meth)acrylate, p-tolyl (meth)acrylate, and sorbyl (meth)acrylate. The term "(meth)acrylic acid" herein comprehensively refers to acrylic acid and methacrylic acid, and the term "(meth)acrylate" herein comprehensively refers to acrylate and methacrylate.

Examples of monomers having aromatic rings, such as styrene monomers, and monomers having heterocycles, such as vinylpyridine monomers, include styrene monomers such as styrene, p-tert-butyldimethyl siloxystyrene, o-methylstyrene, p-methylstyrene, p-tert-butylstyrene, p-tert-butoxystyrene, m-tert-butoxystyrene, p-tert-(1-ethoxymethyl) styrene, m-chlorostyrene, p-chlorostyrene, p-fluorostyrene, α-methylstyrene, and p-methyl-α-methylstyrene; vinylpyridine monomers such as 2-vinylpyridine and 4-vinylpyridine; and monomers such as vinyl naphthalene and vinyl anthracene.

These monomers may be used alone or in combination. In particular, the polymer block A is preferably a homopolymer or copolymer produced through a homopolymerization or copolymerization of a monomer having an aromatic ring, such as a styrene monomer, or a monomer having a heterocycle, such as a vinylpyridine monomer.

The polymer block B of the block polymer P is hydrophilic and therefore has an appropriate solubility in an aqueous medium. In addition, it gives dispersion stability to a pigment dispersion in water. Examples of such a hydrophilic polymer block B include polymer blocks each having a repeating unit of the residue of a monomer having a hydrophilic group, such as an anionic group, e.g., a carboxyl group, a sulfonate group, or a phosphate group; a cationic group, e.g., an amino group; and a nonionic group, e.g., a polyoxyalkylene group or a hydroxyl group.

In the case where the block polymer P is a vinyl polymer, specific examples of the monomer having a hydrophilic group include monomers containing a sulfonate group, such as styrene sulfonic acid, 4-(methacryloyloxy)butyl sulfonic acid, methallyl sulfonic acid, vinyl sulfonic acid, 2-acrylamide-2-methyl propane sulfonic acid, and salts thereof; monomers containing a phosphate group, such as 2-(methacryloyloxy)ethyl phosphate and salts thereof; monomers containing a carboxyl group, such as methacrylic acid, acrylic acid, vinyl benzoic acid, vinyl acetic acid, maleic anhydride, maleic acid, maleate, fumarate, crotonic acid, itaconic acid, fumaric acid, citraconic anhydride, mono 2-(methacryloyloxy)ethyl phthalate, mono 2-(methacryloyloxy)ethyl succinate, mono 2-(acryloyloxy)ethyl succinate, and salts thereof; monomers containing a hydroxyl group, such as 2-hydroxyethyl methacrylate, 2-hydroxyethyl acrylate, 2-hydroxypropyl methacrylate, 2-hydroxypropyl acrylate, 4-hydroxybutyl methacrylate, and 4-hydroxybutyl acrylate; monomers containing polyalkylene oxide, such as polyethylene glycol methacrylate and polyethylene glycol acrylate; monomers containing an amino group, such as dimethyl aminoethyl methacrylate, dimethyl aminoethyl acrylate, diethyl aminoethyl methacrylate, and diethyl aminoethyl acrylate; and monomers containing an quaternary ammonium salt, such as [(2-methacryloyloxy)ethyl] trimethylammonium chloride and [(2-acryloyloxy)ethyl] trimethylammonium chloride.

In particular, a carboxyl group is preferred in view of easy preparation thereof, the variety of monomers, and easy production of the monomers. Two carboxyl groups may be turned into an anhydride group by dehydration condensation in a molecule or between molecules. Those monomers may be used alone or in combination.

The polymer block B may be a copolymer of the above-mentioned vinyl monomer having a hydrophilic group and another vinyl monomer. The vinyl monomer usable for copolymerization with the vinyl monomer having a hydrophilic group is preferably a (meth)acrylate monomer in view of copolymerizability with the vinyl monomer having a hydrophilic group. Specific examples thereof include alkyl (meth)acrylates such as methyl (meth)acrylate, ethyl (meth) acrylate, n-propyl (meth)acrylate, isopropyl (meth)acrylate, n-butyl (meth)acrylate, sec-butyl (meth)acrylate, isobutyl (meth)acrylate, t-butyl (meth)acrylate, 2-ethylhexyl (meth) acrylate, decyl (meth)acrylate, undecyl (meth)acrylate, dodecyl (meth)acrylate (lauryl (meth)acrylate), tridecyl (meth)acrylate, pentadecyl (meth)acrylate, hexadecyl (meth)acrylate, heptadecyl (meth)acrylate, octadecyl (meth) acrylate (stearyl (meth)acrylate), nonadecyl (meth)acrylate, and icosanyl (meth)acrylate; phenylalkylene (meth)acrylate such as benzyl (meth)acrylate; and alkoxyalkyl (meth)acrylate such as ethoxyethyl (meth)acrylate.

In the case where the block polymer P is produced by living anionic polymerization that will be described later, the polymer block B is a polymer block that is a homopolymer or copolymer which can be produced by homopolymerization of a (meth)acrylate having a protecting group that can be restored to an anionic group through deprotection or by copolymerization thereof with another monomer and in which some or all of the protecting groups are restored to anionic groups. In the case where the monomer used in living anionic polymerization is a monomer containing a group having an active proton, such as an anionic group, the active terminal of the living anionically polymerized polymer immediately reacts with such a group having an active proton and is then deactivated; hence, a polymer is not produced. Since a monomer containing a group having an active proton is difficult to be polymerized in its initial state in living anionic polymerization, it is preferred that polymerization be carried out in a state in which the group having an active proton is protected and that the protecting group be then deprotected to recover the group having an active proton.

For such a reason, in the case where the block polymer P is produced by living anionic polymerization, the polymer block B preferably involves use of a monomer containing (meth)acrylate having a protecting group that can be restored to an anionic group by deprotection. Use of such a monomer enables the above-mentioned inhibition of the polymerization to be prevented. The anionic group protected by conversion into a protecting group can be returned to an anionic group by deprotection after production of the block polymer P.

In the case where the anionic group is, for instance, a carboxyl group, the carboxyl group is esterified and then deprotected through hydrolysis or another process to be restored to the original state. In such a case, a protecting group that can be restored to a carboxyl group is preferably a group having an ester bond; examples of such a group include primary alkoxycarbonyl groups such as a methoxycarbonyl group, an ethoxycarbonyl group, an n-propoxycarbonyl group, and an n-butoxycarbonyl group; secondary alkoxycarbonyl groups such as an isopropoxycarbonyl group and a sec-butoxycarbonyl group; tertiary alkoxycarbonyl groups such as a t-butoxycarbonyl group; phenyl alkoxycarbonyl groups such as a benzyloxycarbonyl group; and alkoxyalkyl carbonyl groups such as an ethoxyethyl carbonyl group.

In the case where the anionic group is a carboxyl group, examples of usable monomers include alkyl (meth)acrylates such as methyl (meth)acrylate, ethyl (meth)acrylate, n-propyl (meth)acrylate, isopropyl (meth)acrylate, n-butyl (meth)acrylate, sec-butyl (meth)acrylate, isobutyl (meth)acrylate, t-butyl (meth)acrylate, 2-ethylhexyl (meth)acrylate, decyl (meth)acrylate, undecyl (meth)acrylate, dodecyl (meth)acrylate (lauryl (meth)acrylate), tridecyl (meth)acrylate, pentadecyl (meth)acrylate, hexadecyl (meth)acrylate, heptadecyl (meth)acrylate, octadecyl (meth)acrylate (stearyl (meth)acrylate), nonadecyl (meth)acrylate, and icosanyl (meth)acrylate; phenylalkylene (meth)acrylate such as benzyl (meth)acrylate; and alkoxyalkyl (meth)acrylate such as ethoxyethyl (meth)acrylate. These (meth)acrylates (c1) may be used alone or in combination. Among these (meth)acrylates (c1), t-butyl (meth)acrylate and benzyl (meth)acrylate are preferred because use of these (meth)acrylates enables easy conversion to the carboxyl group. More preferred is t-butyl (meth)acrylate in view of easy industrial preparation thereof.

((Solubility Parameters of Polymer Block A and Polymer Block B)

It is preferred that the polymer block A and the polymer block B have difference in the value of solubility parameter. The relationship (solubility parameter of polymer block A)/(solubility parameter of polymer block B) is preferably in the range of 0.29 to 0.73.

The term "solubility parameter (Sp value)" herein refers to a value obtained by multiplying the Sp value (Sp (Ui)) of the monomer unit (structural unit) of a polymer by the number of moles.

In the present invention, the "solubility parameter of polymer block A" is the value obtained by multiplying the Sp value of the monomer unit constituting the polymer block A, for example, a monomer having a hydrophobic group such as an alkyl group (e.g., a methyl group, an ethyl group, an isobutyl group, or a butyl group such as a t-butyl group), an cycloalkyl group (e.g., a cyclohexyl group), or an aromatic group (e.g., a phenyl group, a biphenyl group, or a naphthyl group), by the number of moles; the "solubility parameter of polymer block B" is the value obtained by multiplying the Sp value of the monomer unit constituting the polymer block B, for instance, a monomer having a hydrophilic group such as an anionic group (e.g., a carboxyl group, a sulfonate group, or a phosphate group), a cationic group (e.g., an amino group), or a nonionic group (e.g., a polyoxyalkylene group or a hydroxyl group), by the number of moles.

The Sp value (Ui) can be obtained from Fedors Equation (F) described in *Polymer Engineering and Science*; Vol. 14. 1974; 147.

[Math. 1]

$$Sp(Ui)=[(\Sigma E_{coh}/\Sigma V)]^{1/2} \qquad (F)$$

In Equation (F), $E_{coh}$ represents cohesive energy density (J/mol), and V represents a molar molecular volume (cm$^3$/mol).

Table 1 shows "Sp values (Sp (Ui)) of typical monomers" calculated in accordance with Hideki Yamamoto. *SPchi Kiso Ouyou to Keisanhouhou*; JOHHOKIKO CO., LTD., 2005; Table 13, pp 67.

TABLE 1

| Monomer | Sp (Ui) |
| --- | --- |
| Acrylic acid | 28.62 |
| Methacrylic acid | 25.65 |
| n-butyl methacrylate | 19.33 |
| t-butyl methacrylate | 18.57 |
| Styrene | 20.09 |
| Cyclohexyl methacrylate | 19.89 |
| 2-hydroxyethyl methacrylate | 27.56 |
| 2-ethylhexyl methacrylate | 18.50 |

(Production of Block Polymer P)

The block polymer P is a block polymer in which the polymer block A and the polymer block B are linked to each other via a single bond or linking group and preferably a linear polymer. The block polymer P preferably includes one polymer block A and one polymer block B; in particular, the block polymer P has a structure of "polymer block A-(single bond or linking group)-polymer block B".

A vinyl polymer having the intended number average molecular weight in the present invention can be produced through polymerization such as radical polymerization, cationic polymerization, or an anionic polymerization; in particular, it is preferably produced through "living polymerization", such as living radical polymerization, living cationic polymerization, or living anionic polymerization, in terms of production of a block polymer having a controlled structure.

The block polymer P is particularly preferably a vinyl polymer produced by using a (meth)acrylate monomer as one of the materials; in this case, such a vinyl polymer is preferably produced by living radical polymerization or living anionic polymerization.

(Block Polymer P Produced by Living Radical Polymerization)

Known living radical polymerization, for example, involves use of a transition metal catalyst or use of a RAFT agent ("RAFT" is the acronym of Reversible Addition-fragmentation Chain transfer) that is an organosulfur compound, such as a dithiocarboxylic acid ester, that serves as a chain-transfer agent. In the present invention, impurities that may be attributed to generation of coarse particles are preferably reduced as much as possible; from this viewpoint, use of an RAFT agent that is free from residual metal is preferred.

RAFT polymerization involves use of a polymerization initiator and a reversible addition-fragmentation chain-transfer agent (hereinafter referred to as "RAFT agent"). This polymerization enables better productivity than any other living radical polymerization in terms of (1) being applicable to a variety of monomers and (2) being usable in a broad range of reaction conditions. Examples of the RAFT agent used for producing the acrylic resin of the present invention include, but are not limited to, dithio carbonates such as O-ethyl-S-(1-phenylethyl)dithiocarbonate, O-ethyl-S-(2-propoxyethyl)dithiocarbonate, and O-ethyl-S-(1-cyano-1-methylethyl)dithiocarbonate; dithio esters such as dithiopropionic acid cyanoethyl ester, dithiopropionic acid benzyl ester, dithiobenzoic acid benzyl ester, and dithiobenzoic acid acetoxyethyl ester; dithiocarbamates such as S-benzyl-N,N-dimethyl dithiocarbamate and benzyl-1-pyrrole carbodithioate; and trithiocarbonates such as dibenzyl trithiocarbonate and S-cyanomethyl-S-dodecyl trithiocarbonate.

The RAFT agent to be used is appropriately determined on the basis of the reactivity of a monomer; in particular, dithiocarbamates or dithiocarbonates are preferred for polymerization of an acrylic acid ester, and dithio esters are preferred for polymerization of a methacrylic acid ester. The amount of the RAFT agent to be used is preferably in the range of 0.01 to 10 parts by mass, and more preferably 0.05 to 3 parts by mass relative to 100 parts by mass of the whole monomers to be used. At an amount of less than 0.01 parts by mass, the molecular weight distribution does not become sufficiently narrow; at an amount of greater than 10 parts by mass, the average molecular weight is likely to be small.

In living radical polymerization, a polymerization process is not particularly limited; for instance, it may be any of typical polymerization processes, such as bulk polymerization, solution polymerization, suspension polymerization, and emulsion polymerization, and preferably solution polymerization. In solution polymerization, any solvent can be used. Examples of usable solvent include aromatic hydrocarbons such as benzene, toluene, and xylene; alicyclic hydrocarbons such as cyclohexane; aliphatic hydrocarbons such as n-hexane and n-octane; ketones such as acetone, methyl ethyl ketone, and cyclohexanone; ethers such as tetrahydrofuran and dioxane; esters such as ethyl acetate and butyl acetate; amides such as N,N-dimethylformamide and N,N-dimethylacetamide; sulfoxides such as dimethyl sulfoxide; alcohols such as methanol and ethanol; and polyalcohol derivatives such as ethylene glycol monomethyl ether, ethylene glycol monomethyl ether acetate, and propylene glycol monomethyl ether acetate.

In living radical polymerization, a first polymer block is polymerized in the presence of the RAFT agent, and then a monomer that is the material of a second polymer block is fed and polymerized. In the living radical polymerization, the hydrophobic polymer block A as an example of the first polymer block may be polymerized, and then the hydrophilic polymer block B as an example of the second polymer block may be polymerized; however, these polymerization steps may be performed in the reverse order or any order.

(Block Polymer P Produced by Living Anionic Polymerization)

In living anionic polymerization, an alkylmetal reagent, alkali metal, or alkali earth metal is used as a reaction initiator to make a polymerizable unsaturated monomer be anionic (initiation reaction), and a termination reaction caused by deactivation of the growth terminal and a chain transfer reaction in which the active spot transfers to another substance in a system are prevented from progressing, so that only the initiation reaction and the growth reaction progress. In other words, the growth terminal is constantly active, and a polymerizable unsaturated monomer is newly put into the system to further promote the growth reaction; in addition, the rate of initiation reaction is adjusted to be sufficiently higher than the rate of the growth reaction, which makes it easier to produce a polymer chain having an even molecular weight.

Specific examples of the polymerization initiator used in the anionic polymerization include organolithiums such as n-butyl lithium, sec-butyl lithium, and t-butyl lithium; alkylene dilithium such as 1,4-dilithiobutane; and phenyl lithium, stilbene lithium, lithium naphthalene, sodium naphthalene, potassium naphthalene, n-butyl magnesium, n-hexyl magnesium, ethoxycalcium, calcium stearate, t-butoxystrontium, ethoxybarium, isopropoxybarium, ethyl mercaptobarium, t-butoxybarium, phenoxybarium, diethyl aminobarium, and barium stearate. Among these, organolithiums are preferred.

Examples of the organolithium initiators include alkyllithiums such as methyllithium, ethyllithium, propyllithium, butyllithium (e.g., n-butyllithium, sec-butyllithium, iso-butyllithium, and tert-butyllithium), pentyllithium, hexyllithium, methoxymethyllithium, and ethoxymethyllithium; phenylalkylenelithiums such as benzyllithium, α-methylstyryllithium, 1,1-diphenyl-3-methylpentyllithium, 1,1-diphenylhexyllithium, and phenylethyllithium; alkenyllithiums such as vinyllithium, allyllithium, propenyllithium, and butenyllithium; alkynyllithiums such as ethynyllithium, butynyllithium, pentynyllithium, and hexynyllithium; aryllithiums such as phenyllithium and naphthyllithium; heterocyclic lithiums such as 2-thienyllithium, 4-pyridyllithium, and 2-quinolyllithium; and magnesium complexes of alkyllithiums, such as tri(n-butyl)magnesium lithium and trimethyl magnesium lithium.

In the case where a (meth)acrylate monomer is directly polymerized with the active terminal of a highly nucleophilic styrene polymer in the living anionic polymerization, a nucleophilic attack on the carbonyl carbon hinders polymerization in some cases. Hence, in such polymerization of a (meth)acrylate monomer, a reaction controlling agent is used to adjust the nucleophilicity, and then the polymerization is performed. Specific examples of the reaction controlling agent include diphenylethylene, α-methylstyrene, and p-methyl-α-methylstyrene.

In the case where the reaction controlling agent is used, the block polymer P in the present invention is a polymer having a molecular structure of a block A-block B in which the polymer block A and the polymer block B are linked to each other owing to the reaction controlling agent. In particular, the block polymer P, for example, has the following structure.

[Chem. 1]

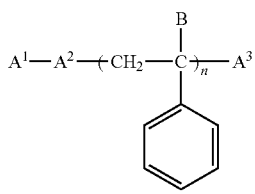

(1)

In Formula (1), $A^1$ represents the residue of an organolithium initiator, $A^2$ represents the polymer block of a monomer having an aromatic ring or heterocycle, $A^3$ represents a polymer block containing an anionic group, n is an integer from 1 to 5, and B represents an aromatic group or an alkyl group.

In General Formula (1), $A^1$ represents the residue of an organolithium initiator. Specific examples of the organolithium initiator include alkyllithiums such as methyllithium, ethyllithium, propyllithium, butyllithium (e.g., n-butyllithium, sec-butyllithium, iso-butyllithium, and tert-butyllithium), pentyllithium, hexyllithium, methoxymethyllithium, and ethoxymethyllithium; phenylalkylenelithiums such as benzyllithium, α-methylstyryllithium, 1,1-diphenyl-3-methylpentyllithium, 1,1-diphenylhexyllithium, and phenylethyllithium; alkenyllithiums such as vinyllithium, allyllithium, propenyllithium, and butenyllithium; alkynyllithiums such as ethynyllithium, butynyllithium, pentynyllithium, and hexynyllithium; aryllithiums such as phenyllithium and naphthyllithium; heterocyclic lithiums such as 2-thienyllithium, 4-pyridyllithium, and 2-quinolyllithium; and magnesium complexes of alkyllithiums, such as tri(n-butyl)magnesium lithium and trimethyl magnesium lithium.

In the organolithium initiator, the bonding between an organic group and lithium cleaves, an active terminal is generated on the organic group side, and polymerization is initiated therefrom. Accordingly, an organic group derived from the organolithium is bonded to the polymer terminal to be produced. Such an organic group derived from organolithium and bonded to the polymer terminal is herein referred to as "residue of the organolithium initiator". In a polymer involving use of methyllithium as the initiator, the residue of the organolithium initiator is a methyl group; in a polymer involving use of butyllithium as the initiator, the residue of the organolithium initiator is a butyl group.

In General Formula (1), $A^2$ represents the polymer block A having a hydrophobic group. $A^2$ serves for the proper balance of solubility as described above and is preferably a group that is highly adsorbent to a pigment on its contact therewith. From this standpoint, $A^2$ is preferably the polymer block of a monomer having an aromatic ring or heterocycle.

In particular, the polymer block of a monomer having an aromatic ring or heterocycle is the polymer block of a homopolymer or copolymer produced by homopolymerization or copolymerization of a monomer having an aromatic ring, such as a styrene monomer, or a monomer having a heterocycle, such as a vinylpyridine monomer.

Examples of the monomer having an aromatic ring include styrene monomers such as styrene, p-tert-butyldimethyl siloxystyrene, o-methylstyrene, p-methylstyrene, p-tert-butylstyrene, p-tert-butoxystyrene, m-tert-butoxystyrene, p-tert-(1-ethoxymethyl)styrene, m-chlorostyrene, p-chlorostyrene, p-fluorostyrene, α-methylstyrene, and p-methyl-α-methylstyrene; vinylnaphthalene; and vinylanthracene.

Examples of the monomer having a heterocycle include vinylpyridine monomers such as 2-vinylpyridine and 4-vinylpyridine.

These monomers may be used alone or in combination.

In General Formula (1), $A^3$ represents the polymer block B containing an anionic group. $A^3$ contributes to proper solubility as described above and serves to give dispersion stability in water when it is used in a pigment dispersion.

Examples of the anionic group in $A^3$ include a carboxyl group, a sulfonate group, and a phosphate group. Among these, a carboxyl group is preferred in view of easy preparation thereof, the variety of monomers, and easy production of the monomers. Furthermore, two carboxyl groups may be turned into an anhydride group by dehydration condensation in a molecule or between molecules.

The anionic group of $A^3$ can be introduced by any technique and may be introduced, for example, as follows: a homopolymer obtained through homopolymerization of (meth)acrylate having a protecting group that can be restored to an anionic group by deprotection or a copolymer obtained through copolymerization thereof with another monomer is prepared, and then some or all of the protecting groups are restored to anionic groups; in the case where the anionic group is a carboxyl group, a homopolymer obtained through homopolymerization of a (meth)acrylic acid or a copolymer obtained by copolymerization thereof with another monomer may be employed.

The ester bond of the protecting group that can be restored to an anionic group may be returned to the anionic group by deprotection, such as hydrolysis, in the following manner.

The hydrolysis reaction of the ester bond progresses under either acidic conditions or basic conditions; however, there is some difference in the conditions on the basis of the type of the group having an ester bond. In the case where the group having an ester bond is, for instance, a primary alkoxycarbonyl group, such as methoxycarbonyl, or a secondary alkoxycarbonyl group, such as isopropoxycarbonyl, the hydrolysis can be carried out under basic conditions to obtain a carboxyl group. In this case, examples of a basic compound that enables basic conditions include metal hydroxides such as sodium hydroxide and potassium hydroxide.

In the case where the group having an ester bond is a tertiary alkoxycarbonyl group such as a t-butoxycarbonyl group, hydrolysis can be carried out under acidic conditions to obtain a carboxyl group. Examples of an acidic compound that enables acidic conditions include mineral acids such as hydrochloric acid, sulfuric acid, and phosphoric acid; Broensted acids such as trifluoroacetic acid; and Lewis acids such as trimethylsilyl triflate. The reaction conditions of hydrolysis of a t-butoxycarbonyl group under acidic conditions is, for instance, disclosed in Jikken Kagaku Kouza 16. *Yuki Kagoubutsu no Gousei IV*; fifth edition. The Chemical Society of Japan.

In order to convert a t-butoxycarbonyl group into a carboxyl group, a cation-exchange resin may be used in place of the above-mentioned acids. Examples of the cation-exchange resin include resins of which side chains of the polymer chains have acid groups, such as a carboxyl group (—COOH) and a sulfo group (—SO3H). In particular, a strongly acidic cation-exchange resin in which a side chain has a sulfo group is preferred because it enhances the progress of the reaction. An example of commercially available products of the cation-exchange resin that can be used in the present invention is a strongly acidic cation-exchange resin Amberlite manufactured by ORGANO CORPORATION. The amount of the cation-exchange resin to be used is preferably in the range of 5 to 200 parts by mass, and more preferably 10 to 100 parts by mass relative to 100 parts by mass of the polymer represented by General Formula (1) in order to enable effective hydrolysis.

In the case where the group having an ester bond is a phenyl alkoxycarbonyl group such as a benzyloxycarbonyl group, hydrogenation reduction is carried out to convert it to a carboxyl group. In this case, the reaction can be performed at room temperature with hydrogen gas as a reductant in the presence of a palladium catalyst such as palladium acetate to quantitatively convert the phenyl alkoxycarbonyl group into a carboxyl group.

Reaction conditions for the conversion to a carboxyl group vary on the basis of the type of the group having an ester bond as described above; hence, in the case where t-butyl (meth)acrylate and n-butyl (meth)acrylate are, for example, used as the materials of A3 for copolymerization, the produced polymer has both a t-butoxycarbonyl group and an n-butoxycarbonyl group. Since the n-butoxycarbonyl group is not hydrolyzed under acid conditions under which the t-butoxycarbonyl group is hydrolyzed, only the t-butoxycarbonyl group can be selectively hydrolyzed for deprotection into a carboxyl group. Hence, a monomer that contains a (meth)acrylate having a protecting group which can be restored to an anionic group and that is the material monomer of A3 can be appropriately selected to adjust the acid value of the hydrophilic block (A3).

In the case where $A^3$ is a homopolymer produced through homopolymerization of a (meth)acrylic acid or a copolymer produced through copolymerization thereof with another monomer, specific examples of a (meth)acrylic acid or (meth)acrylate to be used include (meth)acrylic acid, methyl (meth)acrylate, ethyl (meth)acrylate, iso-propyl (meth)acrylate, allyl (meth)acrylate, n-butyl (meth)acrylate, iso-butyl (meth)acrylate, sec-butyl (meth)acrylate, tert-butyl (meth) acrylate, n-amyl (meth)acrylate, iso-amyl (meth)acrylate, n-hexyl (meth)acrylate, n-octyl (meth)acrylate, 2-ethylhexyl (meth)acrylate, n-lauryl (meth)acrylate, n-tridecyl (meth) acrylate, n-stearyl (meth)acrylate, phenyl (meth)acrylate, benzyl (meth)acrylate, cyclohexyl (meth)acrylate, 4-tert-butyl cyclohexyl (meth)acrylate, isobornyl (meth)acrylate, tricyclodecanyl (meth)acrylate, dicyclopentadienyl (meth) acrylate, adamantyl (meth)acrylate, glycidyl (meth)acrylate, tetrahydrofurfuryl (meth)acrylate, 2-methoxyethyl (meth) acrylate, 2-ethoxyethyl (meth)acrylate, dimethyl aminoethyl (meth)acrylate, diethyl aminoethyl (meth)acrylate, trifluoroethyl (meth)acrylate, tetrafluoropropyl (meth)acrylate, pentafluoropropyl (meth)acrylate, octafluoropentyl (meth) acrylate, pentadecafluorooctyl (meth)acrylate, heptadecafluorodecyl (meth)acrylate, N,N-dimethyl(meth)acrylamide, (meth)acryloyl morpholine, (meth)acrylonitrile, polyethylene glycol (meth)acrylate, polypropylene glycol (meth)acrylate, polyethylene glycol-polypropylene glycol (meth)acrylate, polyethylene glycol-polybutylene glycol (meth)acrylate, polypropylene glycol-polybutylene glycol (meth)acrylate, methoxypolyethylene glycol (meth)acrylate, ethoxypolyethylene glycol (meth)acrylate, butoxypolyethylene glycol (meth)acrylate, octoxypolyethylene glycol (meth)acrylate, lauroxypolyethylene glycol (meth)acrylate, stearoxypolyethylene glycol (meth)acrylate, phenoxypolyethylene glycol (meth)acrylate, methoxypolypropylene glycol (meth)acrylate, and (meth)acrylate containing a poly-alkylene oxide group, such as octoxypolyethylene glycol-polypropylene glycol (meth)acrylate. These monomers may be used alone or in combination.

In General Formula (1), B represents an aromatic group or an alkyl group having 1 to 10 carbon atoms. n represents an integer from 1 to 5.

As described above, in the case where a (meth)acrylate monomer is directly polymerized with the active terminal of a highly nucleophilic styrene polymer in living anionic polymerization, a nucleophilic attack on the carbonyl carbon hinders polymerization in some cases. Hence, when a (meth) acrylate monomer is polymerized for $A^1$-$A^2$, a reaction controlling agent is used to adjust nucleophilicity, and then the (meth)acrylate monomer is polymerized. B in General Formula (1) is a group derived from the reaction controlling agent. Specific examples of the reaction controlling agent include diphenylethylene, α-methylstyrene, and p-methyl-α-methylstyrene.

The block polymer P obtained through such living anionic polymerization is a block polymer having a molecular structure of block A-block B in which one end of the polymer block A is linked to one end of the polymer block B via a linking group derived from the reaction controlling agent.

(Molar Ratio A:B of Polymer Block a to Polymer Block B)

Clear separation of the polymer block A and the polymer block B from each other in the block polymer P contributes to better stability of an aqueous pigment dispersion to be produced. The molar ratio A:B of the polymer block A to the polymer block B is preferably in the range of 100:10 to 100:500. In the case where the proportion of B to 100 of A is less than 10, the dispersion stability of a pigment and ejection stability thereof in ink-jet ejection are likely to be insufficient. In the case where the proportion of B to 100 of A is greater than 500, the polymer is unnecessarily hydrophilic and is likely to penetrate into a recording medium when it is, for example, paper, which results in a reduction in color development. In particular, the ratio A:B is preferably from 100:10 to 100:450.

The number of monomers each having an aromatic ring or heterocycle, which constitute the polymer block A, is preferably in the range of 5 to 40, more preferably 6 to 30, and most preferably 7 to 25. The number of anionic groups contained in the polymer block B is preferably in the range of 3 to 20, more preferably 4 to 17, and most preferably 5 to 15.

The molar ratio A:B of the polymer block A to the polymer block B is preferably from 100:7.5 to 100:400 in terms of the molar ratio of the number of moles of monomers each having an aromatic ring or heterocycle, which constitute the polymer block A, to the number of moles of anionic groups contained in the polymer block B.

(Acid Value of Block Polymer P)

The acid value of the block polymer P is preferably from 40 to 400 mgKOH/g, more preferably 40 to 300 mgKOH/g, and most preferably 40 to 190 mgKOH/g. At an acid value of less than 40 mgKOH/g, the dispersion stability of a pigment and the ejection stability thereof in ink-jet ejection may be insufficient. At an acid value of greater than 400 mgKOH/g, the polymer becomes more hydrophilic and easily penetrates into a recording medium, which results in a reduction in color development. An acid value of greater than 190 mgKOH/g may affect the water resistance of an ink to be produced in some cases.

The acid value of the polymer in the present invention is measured in accordance with JIS K 0070-1992. In particular, 0.5 g of a sample is dissolved in a THF solvent, and titration that involves use of phenolphthalein as an indicator is performed with 0.1 M of an alcohol solution of potassium hydroxide to determine the acid value.

(Core-shell Polymer Particles)

The block polymer P is in the form of fine particles in water when the degree of the above-mentioned neutralization of the anionic group with a basic compound is 100%.

Any of known basic compounds can be used provided that it can serve to neutralize an anionic group to form a salt. Examples of the basic compound include inorganic basic substances such as alkali metal hydroxides, e.g., sodium hydroxide and potassium hydroxide, and organic basic compounds such as ammonium, triethylamine, and alkanolamine.

In the present invention, when it is determined whether at least one minimum value in a scattering profile is present within the range of a scattering vector q from 0.1 to 1 nm-1 in measurement of a scattering profile by small- or ultra-small-angle X-ray scattering that involves use of synchrotron radiation which will be described later, a test solution is adjusted to be in 100% of degree of neutralization with respect to the acid value of the block polymer P. In use of the block polymer P as a pigment dispersant, the degree of neutralization does not need to be 100% relative to the acid value of the block polymer P and is dispersed in the proper degree of neutralization for a technique for dispersing a pigment. In particular, it is preferably dispersed in a state in which the degree of neutralization in the block polymer P is from 20% to 200%, and more preferably from 80% to 150%.

The neutralization is performed as follows.

(1) The acid value of the polymer is preliminarily measured by a method for measuring an acid value in accordance with JIS K 0070-1992. In particular, 0.5 g of a polymer is dissolved in a tetrahydrofuran (hereinafter also referred to as "THF") solvent, and titration that involves using phenolphthalein as an indicator is performed with 0.1 M of an alcohol solution of potassium hydroxide to determine the acid value.

(2) To 50 ml of water, 1 g of a polymer is added, the acid value thereof is measured, and then 0.1 mol/L of an aqueous solution of potassium hydroxide is added thereto for neutralization in an amount that is enough to neutralize 100% of the acid value. In this case, the following equation is given.

[Math. 2]

Degree of Neutralization (%)=((Mass of Basic Compound (g)×56×1000)/(Acid Value of Polymer(A) (mgKOH/g)×Equivalent of Basic Compound× Mass of Polymer(A)(g))×100

[Measurement by Small-Angle X-Ray Scattering]

In the case where the block polymer P subjected to the neutralization of the anionic group with a basic compound at the degree of neutralization of 100% is in the form of fine particles in water and where the fine particles undergo measurement of a scattering profile by small- or ultra-small-angle X-ray scattering that involves use of synchrotron radiation, at least one minimum value in the scattering profile is present within the range of a scattering vector q from 0.1 to 1 nm-1.

In this case, the block polymer P is in the form of core-shell polymer particles in water.

Small-angle X-ray scattering is a non-destructive technique for analyzing the structure of an object having a size ranging approximately from 1 to 100 nm. X-rays radiated to a substance are scattered in the manner that reflects the electron densities of atoms or molecules that constitute the substance. In particular, a technique in which scattering in the region near X-rays that have passed through a substance, namely the small-angle region of a scattering angle of $0.1<(2\theta)<10°$, is measured is referred to as small-angle X-ray scattering. A technique in which the measurement covers not only the small-angle region but also the region of a scattering angle of $0°<(2\theta)\leq0.1°$ is referred to as ultra-small-angle X-ray scattering. In the present invention, either of the techniques can be employed for evaluation and is therefore comprehensively referred to as small-angle X-ray scattering.

The magnitude of a scattering vector q is defined by Equation (1).

[Math. 3]

$$q = \frac{4\pi}{\lambda}\sin\frac{\theta}{2} \qquad (1)$$

$\lambda$ represents the wavelength of X-rays, and $2\theta$ represents a scattering angle. These are measured values that depend on measuring equipment and the setup thereof. In small-angle X-ray scattering, measured intensity of scattering light is plotted with respect to a vector q obtained by calculation to perform analysis.

In order to determine the shape and size of a polymer in a solvent, incident X-rays need to have a high brightness. This is because the resin and the solvent have close electron densities to each other and thus scattering contrast is significantly insufficient in many cases. The brightness of incident X-rays is preferably not less than $10^{16}$ (photons/sec/mm$^2$/mrad$^2$/0.1% bandwidth), and more preferably not less than $10^{18}$ in order to perform the measurement in a practical time and at good accuracy.

X-rays at high brightness of not less than $10^{16}$ can be obtained by using the light source of a large-scale synchrotron radiation facility, such as SPring-8 located in Hyogo Prefecture or Photon Factory located in Ibaraki Prefecture.

The process includes steps A to D and will be described in detail. The process has a step (A) for obtaining a scattering signal from an X-ray scattering experiment, a step (B) for calculating an expected scattering profile from a theoretical model, a step (C) for fitting, and a step (D) for obtaining the intended physical values.

A measurement sample of the block polymer P is prepared as follows.

(1) To 0.3 g of a powder block polymer P, 0.43 g of diethylene glycol is added. Then, 1.5 g of distilled water and 0.1 mol/L of an aqueous solution of potassium hydroxide in an amount that is enough to neutralize 100% of the acid value preliminarily determined by the above-mentioned method in accordance with JIS K 0070-1992 are added thereto under stirring with heating to 80° C.

(2) The product is stirred for 2 hours while the temperature is maintained at 80° C.

(3) The resulting product is subjected to dispersion for 15 minutes with an ultrasonic washer (output: 100 W) and then stirred for 10 minutes with a conditioning mixer.

(4) To the resulting product, 1.5 g of distilled water is further added.

Then, the steps (2) and (3) are repeated five times.

The product is subsequently diluted so that the solid content is 0.5 mass % in a mixture solution having the ratio of diethylene glycol:water of 0.43:3.0, thereby obtaining a measurement sample.

In the step (A), a measurement sample is put into a commercially available glass tube, and then the tube is attached to a sample holder or a sample stage. White light taken from a circular accelerator called a storage ring is monochromatized with a double crystal monochromator in order to employ a beam having a wavelength in an X-ray region (e.g., 1 Å) as a source. X-rays are radiated to the measurement sample attached to a sample stage, a two-dimensional detector is exposed to scattered light for a predetermined time. The obtained two-dimensional scattering profile that is concentric circular is averaged to be one dimensional to obtain a scattering profile that shows the scattering angle 2θ dependence of scattering intensity I (q). The wavelength and scattering angle 2θ in the measurement conditions are substituted in Equation (1) to calculate a scattering vector q, and then the scattering intensity I is plotted with respect to the scattering vector q. The obtained profile is referred to as "measured scattering profile".

In the present invention, the expression "at least one minimum value in a scattering profile, which is measured by small- or ultra-small-angle X-ray scattering that involves use of synchrotron radiation, is present within the range of a scattering vector q from 0.1 to 1 nm$^{-1}$" means the following: the scattering vector q is calculated from the measured scattering angle 2θ in the step (A), the "measured scattering profile" in which the horizontal axis is the q vector and in which the vertical axis is the measured scattering intensity I is defined, and at least one minimum value exists within the range of a scattering vector q from 0.1 to 1 nm$^{-1}$ in the measured scattering profile. FIG. 2 shows an example thereof. FIG. 2 is a measured scattering profile obtained in Example 1 which will be described later, and a minimum value is present when q is 0.2 and I(q) is $4.5 \times 10^2$.

The term "minimum value" is based on a general mathematical definition. When a decrease in the function f(x) turns to an increase at x=a, the function f(x) gives a minimum value at x=a. In this case, f(a) is referred to as "minimum value". The minimum value is obtained by differentiation of the function f(x). The derivative of the function f(x) is defined as f'(x). In the vicinity of f'(a)=0 and X=a, when f'(x<a)<0 and f'(x>a)>0 are given, the function f(x) is regarded to give a minimum value at x=a.

The steps (B) to (D) are for obtaining the intended physical value through calculation and fitting.

In the step (B), a theoretical model suitable for a sample is assumed to make an expected scattering profile.

In general, if electron density distribution ρ(r) exists in a substance, the scattering intensity I(q) is defined by Equation (2).

[Math. 4]

$$I(q) = (\int \rho(r)\exp(-iqr)dr)^* \int_V \rho(r)\exp(-iqr)dr = N|F(q)|^2 S(q) \quad (2)$$

In Equation (2), V means that a volume integral is conducted in the whole region, * represents a complex conjugate, and N represents number density. As shown in Equation (2), the scattering intensity I(q) is assumed to be based on two separate factors of a shape factor F(q) attributed to the shape of a structure and a structure factor S(q) attributed to arrangement of particles. In the case where particles exist at random in a substance, S(q)=1 is given.

The shape factor F(q) is represented by Equation (3) in the theoretical core-shell model (Non Patent Literature 1) used for the analysis in the present invention.

[Math. 5]

$$F(q) = \sqrt{16\pi^2(\Delta\rho(r))^2 \left(\frac{s^2}{q^2}\right) \exp(-q^2 t^2)(t_1(q) + t_2(q) + t_3(q) + t_4(q))} \quad (3)$$

In Equation (3), t represents a standard deviation based on the assumption that the electron density distribution at the interface between the shell and the core conforms to Gaussian distribution. $t_1(q)$, $t_2(q)$, $t_3(q)$, and $t_4(q)$ are represented by Equations (4), (5), (6) and (7), respectively.

[Math. 6]

$$t_1(q) = \frac{1}{2}q^2 t^4 \left(1 + \cos 2qR_0 e^{-2s^2 q^2}\right) \quad (4)$$

[Math. 7]

$$t_2(q) = qt^2(R_0 \sin 2qR_0 + 2qs^2 \cos 2qR_0)e^{-2s^2 q^2} \quad (5)$$

[Math. 8]

$$t_3(q) = \frac{1}{2}R_0^2 \left(1 - \cos 2qR_0 e^{-2s^2 q^2}\right) \quad (6)$$

[Math. 9]

$$t_4(q) = \frac{1}{2}s^2 \left(1 + 4qR_0 \sin 2qR_0 e^{-2s^2 q^2} + \cos 2qR_0 (4s^2 q^2 - 1)e^{-2s^2 q^2}\right) \quad (7)$$

In the obtained theoretical prediction formula, a temporarily assumed radius R1, a shell thickness A1, a particle shape distribution S1 are substituted, and an expected scattering profile in which the scattering intensity I is plotted with respect to the scattering vector q is formed.

In the step (C), curve fitting of the measured scattering profile obtained in the step (A) with the expected scattering profile obtained in the step (B) is performed. In the profile fitting, variables to be refined are a core diameter (nm), shell thickness (nm), and particle shape distribution. A chi-square is used as the indicator of the accuracy of the fitting. This means that the smaller the chi-square is, the more the theoretical scattering profile corresponds to the measured scattering profile. The curve fitting is carried out by a least squares method such that chi-square distribution becomes the least.

In the step (D), the new value of the core radius $R_{n+1}$ (n is an integer, $R_n < R_{n+1}$), the value of the shell thickness $A_{n+1}$ (n is an integer, $A_n < A_{n+1}$), and hypothetical normalized variances of these values are added to determine multiple particle size distribution models in accordance with Levenberg-Marquardt algorithm until the chi-square becomes the least, and then the steps (B) and (C) are repeated nine times in row until the value of the chi-square shows no change. In this manner, variables on convergence, which are the core radius, shell thickness, and particle size distribution, can be obtained as analytical results.

The step (B) to (D) are preferably performed with a program such as NIST SANS analysis package (made by National Institute of Standards and Technology) or NANOsolver (made by Rigaku Corporation).

The mechanism that allows the block polymer P used in the present invention and the core-shell polymer particles containing the block polymer P to be used as a pigment dispersant that enables a pigment to be well dispersed has been still studied; however, it is speculated as follows.

The block polymer P in which at least one minimum value in a scattering profile, which is measured by small- or ultra-small-angle X-ray scattering that involves use of synchrotron radiation, is present within the range of a scattering vector q from 0.1 to 1 nm$^{-1}$ is speculated to have a narrow particle size distribution and a complete core-shell structure.

Such a polymer has a clear interface between the lyophobic surface of a pigment and the lyophilic part thereof and thus can stably exist; hence, it is believed to serve as a good pigment dispersant.

The particle size distribution of the core-shell polymer particles is in the range of 0.02 to 0.15. The particle size distribution is the value obtained as a result of performing the process until the step (D).

(Particle Size)

The core-shell polymer particles have a particle size ranging from 4 to 30 nm. The particle size is obtained as a result of performing the process until the step (D).

(Aqueous Pigment Dispersion)

The aqueous pigment dispersion of the present invention contains the polymer block P as a pigment dispersant, a pigment, a basic compound, and an aqueous medium.

(Pigment)

The pigment used in the present invention is not particularly limited, and organic or inorganic pigments that can be generally used in aqueous ink-jet recording inks can be employed. Either untreated pigments or treated pigments can be used.

In particular, any of known inorganic or organic pigments can be used. Examples of the inorganic pigments include iron oxide and carbon blacks produced by known methods such as a contact method, a furnace method, and a thermal method. Examples of the organic pigments include azo pigments (including azolake, insoluble azo pigments, condensed azo pigments, and chelate azo pigments), polycyclic pigments (e.g., phthalocyanine pigments, perylene pigments, perinone pigments, anthraquinone pigments, quinacridone pigments, dioxazine pigments, thioindigo pigments, isoindolinone pigments, and quinophthalone pigments), dye chelates (e.g., basic dye chelates and acid dye chelates), nitro pigments, nitroso pigments, and aniline black.

Examples of those pigments will now be described by color. Examples of pigments used in black inks include carbon blacks such as No. 2300, No. 2200B, No. 900, No. 960, No. 980, No. 33, No. 40, No. 45, No. 45L, No. 52, HCF88, MA7, MA8, and MA100 manufactured by Mitsubishi Chemical Corporation; Raven 5750, Raven 5250, Raven 5000, Raven 3500, Raven 1255, and Raven 700 manufactured by Columbian Chemicals Company; Regal 400R, Regal 330R, Regal 660R, Mogul L, Mogul 700, Monarch 800, Monarch 880, Monarch 900, Monarch 1000, Monarch 1100, Monarch 1300, and Monarch 1400 manufactured by Cabot Corporation; and Color Black FW1, FW2, FW2V, FW18, FW200, S150, S160, and S170, Printex 35, U, V, and 1400U, Special Black 6, 5, 4, and 4A, NIPEX 150, NIPEX 160, NIPEX 170, and NIPEX 180 manufactured by Degussa AG.

Specific examples of pigments used in yellow inks include C. I. Pigment Yellow 1, 2, 12, 13, 14, 16, 17, 73, 74, 75, 83, 93, 95, 97, 98, 109, 110, 114, 120, 128, 129, 138, 150, 151, 154, 155, 174, 180, and 185.

Specific examples of pigments used in magenta inks include C. I. Pigment Red 5, 7, 12, 48(Ca), 48(Mn), 57(Ca), 57:1, 112, 122, 123, 146, 168, 176, 184, 185, 202, 209, and 269 and C. I. Pigment Violet 19.

Specific examples of pigments used in cyan inks include C. I. Pigment Blue 1, 2, 3, 15, 15:3, 15:4, 16, 22, 60, 63, and 66.

Specific examples of pigments used in white inks include sulfates and carbonates of alkaline earth metals, silicas, such as fine powder of silicic acid and synthesized silicate, calcium silicate, alumina, hydrated alumina, titanium oxide, zinc oxide, talc, and clay. These inorganic white pigments may be subjected to a surface treatment by a variety of surface-treating techniques.

(Basic Compound)

Usable basis compounds are the basic compounds described for the core-shell polymer particles.

(Aqueous Medium)

The aqueous medium used in the present invention is water or a mixture of water and a water-soluble organic solvent. The water used in the present invention serves as the dispersion medium of the pigment. Examples of usable water include pure water, such as ion exchanged water, ultrafiltrated water, reverse osmotic water, and distilled water, and ultrapure water.

These types of water may be used alone or combined with a water-soluble solvent into a mixed solvent. Examples thereof include a variety of solvents known as water-soluble organic solvents, for instance, ketones such as acetone, methyl ethyl ketone, methyl butyl ketone, and methyl isobutyl ketone; alcohols such as methanol, ethanol, 2-propanol, 2-methyl-1-propanol, 1-butanol, and 2-methoxyethanol; ethers such as tetrahydrofuran, 1,4-dioxane, and 1,2-dimethoxyethane; glycols such as dimethyl formamide, N-methyl pyrrolidone, ethylene glycol, diethylene glycol, triethylene glycol, tetraethylene glycol, propylene glycol, polyethylene glycol, and polypropylene glycol; diols such as butane diol, pentane diol, hexane diol, and homologous diols thereto; glycol esters such as propylene glycol laurate; glycol ethers such as ethers of diethylene glycol monoethyl, diethylene glycol monobutyl, and diethylene glycol monohexyl and cellosolve including a propylene glycol ether, a dipropylene glycol ether, and a triethylene glycol ether; alcohols such as methanol, ethanol, isopropyl alcohol, 1-propanol, 2-propanol, 1-butanol, 2-butanol, butyl alcohol, pentyl alcohol, and homologous alcohols thereto; sulfolanes; lactones such as γ-butyrolactone; lactams such as N-(2-hydroxyethyl)pyrrolidone; and glycerin and derivatives thereof. These water-soluble organic solvents may be used alone or in combination.

The water-soluble organic solvent to be used is preferably a water-soluble organic solvent having a high boiling point because the solvent does not need to be removed in the subsequent process. Examples of the water-soluble organic solvent having a high boiling point include a variety of solvents known as water-soluble organic solvents, for instance, glycols such as ethylene glycol, diethylene glycol, triethylene glycol, tetraethylene glycol, propylene glycol, polyethylene glycol, and polypropylene glycol; diols such as butane diol, pentane diol, hexane diol, and homologous diols thereto; glycol esters such as propylene glycol laurate; glycol ethers such as ethers of diethylene glycol monoethyl, diethylene glycol monobutyl, and diethylene glycol monohexyl and cellosolve including a propylene glycol ether, a dipropylene glycol ether, and a triethylene glycol ether; sulfolanes; lactones such as γ-butyrolactone; lactams such as N-(2-hydroxyethyl)pyrrolidone; and glycerin and derivatives thereof. These water-soluble organic solvents may be used alone or in combination.

(Process for Producing Aqueous Pigment Dispersion)

The term "aqueous pigment dispersion" herein refers to an aqueous pigment dispersion in which a high concentration of a pigment has been dispersed in water, which serves as a dispersion medium, before production of ink.

The concentration of the pigment in the aqueous pigment dispersion is normally adjusted to be from 10 to 50 mass %. In the case where the aqueous pigment dispersion is used to produce ink, the ink can be produced merely by diluting it through appropriate addition of water or an additive thereto so that the concentration of the pigment is adjusted to be from 0.1 to 20 mass % on the basis of the intended use or physical properties of the ink.

In the present invention, the pigment is preferably dispersed in a mixture of the block polymer P and a water-soluble organic solvent in advance of being dispersed in water that serves as a dispersion medium. In particular, the block polymer P, a basic compound, and the pigment are thoroughly mixed with each other in the presence of a water-soluble organic solvent with a stirrer or disperser for self-dispersion of the pigment and block polymer P in water, and then dispersed product and water are mixed to obtain the aqueous pigment dispersion.

In the present invention, the amount of each of the materials to be used is not particularly limited, but it is preferred that the materials be mixed with reference to the following.

The amount of the block polymer P is, for example, preferably in the range of 5 to 200 parts by mass, and more preferably 5 to 100 parts by mass relative to 100 parts by mass of the pigment.

The amount of the water-soluble organic solvent is preferably in the range of 20 to 200 parts by mass, and more preferably 30 to 200 parts by mass relative to 100 parts by mass of the pigment.

The basic compound is preferably used such that the degree of neutralization of the block polymer P is from 20% to 200%, and more preferably from 80% to 150% as described above. In this case, the degree of neutralization is calculated from the following equation as described above.

[Math. 10]

$$\text{Degree of Neutralization (\%)} = ((\text{Mass of Basic Compound (g)} \times 56 \times 1000)/(\text{Acid Value of Polymer (A) (mgKOH/g)} \times \text{Equivalent of Basic Compound} \times \text{Mass of Polymer (A) (g)})) \times 100$$

In a step for producing the dispersed product of the block polymer P, basic compound, water-soluble organic solvent, and pigment (hereinafter referred to as step (1)), the basic compound used for neutralization of the anionic group of the block polymer P can be the basic compound described above.

The basic compound to be used may be 100% genuine but is preferably in the form of an aqueous solution in consideration of generation of heat.

The water-soluble organic solvent to be used is preferably a water-soluble organic solvent having a high boiling point because the solvent does not need to be removed in the subsequent process; in addition, a water-soluble organic solvent that can be used for preparation of an aqueous ink-jet recording ink without causing problems with the properties of the ink is preferred. Preferred examples of such a water-soluble organic solvent include the above-mentioned water-soluble organic solvents each having a high boiling point. Furthermore, a slight amount of water can be used provided that the effect of the present invention is not impaired; the amount of water is preferably small because the presence of a large amount of water in initially dispersing a pigment may reduce the pigment-dispersing efficiency of the block polymer P and may cause the agglomerate of merely the block polymer P to be formed.

A dispersion technique used in the step (1) is not particularly limited, and any of known dispersion techniques can be used. Examples thereof include dispersion techniques involving use of media, such as a paint shaker, a bead mill, a sand mill, and a ball mill; a dispersion techniques that are free from media, such as an ultrasonic homogenizer, a high-pressure homogenizer, a nanomizer, an altimizer; and kneading dispersion techniques involving application of strong sheer force, such as a roll mill, a Henschel mixer, a pressure kneader, an intensive mixer, a Banbury mixer, and a planetary mixer. In the kneading dispersion techniques, strong sheer force is applied to a mixture containing a pigment and having a high solid concentration with a kneader to form pigment particles into fine particles; they effectively enable production of an aqueous pigment dispersion having a high pigment concentration and a reduction in coarse particles and are therefore preferred.

In the case where the kneading dispersion technique is employed in the step (1), the block polymer P, basic compound, water-soluble organic solvent, and pigment are put in a kneader and then kneaded. These materials may be put in a kneader in any order. The order of putting the materials may be changed on the basis of the types of the materials; for example, the whole materials may be put all together at the same time and then kneaded; the materials may be put little by little; or the block polymer P, the basic compound, and the pigment are put, and then the water-soluble organic solvent is added thereto. The amount of each of the materials to be used can be within the above-mentioned range.

For the application of strong sheer force to a mixture, which is a beneficial point of the kneading dispersion technique, it is preferred that the kneading be performed at a high solid content in the mixture, so that a higher sheer force can be applied to the mixture.

The sheer force applied to the pigment and block polymer P in this case is, for example, preferably not less than 180 MPa, and more preferably not less than 1800 MPa, depending on a kneader to be used. The block polymer P used in the present invention can stay in a well dispersed state even while strong sheer force is applied thereto, so that an aqueous pigment dispersion in which generation of coarse particles has been reduced can be produced.

In order to apply stronger sheer force, the solid content including the pigment and block polymer P contents is preferably not less than 40 mass %, and more preferably not less than 50 mass %.

In order to produce an aqueous pigment dispersion having a high pigment concentration, the amount of the pigment in the mixture is preferably adjusted to be large as much as possible. The amount thereof is, for instance, preferably not less than 35 mass %, and more preferably not less than 40 mass % relative to the amount of the whole mixture.

The content ratio of the pigment to the block polymer P is not particularly limited but normally from 10/0.5 to 10/20, and preferably from 10/0.5 to 10/10 on a mass basis.

The amount of the water-soluble organic solvent to be used is preferably ⅕ or more of the amount of the pigment, and most preferably ⅓ or more thereof on a mass basis.

(Step 2: Dispersion in Water)

The dispersed product obtained in the step 1 is mixed with water to produce an aqueous pigment dispersion containing the pigment and block polymer P (hereinafter referred to as step (2)).

The dispersed product may be added to water; however, it is preferred that an aqueous medium be added to the dispersed product because it enables production of an aqueous pigment dispersion having an even particle size.

Water may be mixed with the dispersed product in any manner; however, water is preferably added in stages in a slight amount and then mixed with the dispersed product because adding water at one time and mixing the water with the dispersed product may result in unsuccessful production of an even aqueous pigment dispersion in some cases. In this case, a disperser is normally used for the dispersion.

The disperser used in the step 2 may be any of known dispersers. Examples of dispersers involving use of media include a paint shaker, a ball mill, an attritor, a basket mill, a sand mill, a sand grinder, a dyno-mill, a dispermat, an SC mill, a spike mill, and an agitator mill. Examples of dispersers that are free from media include an ultrasonic homogenizer, a nanomizer, a desorber, a disper, and a high-speed impeller disperser. After the dispersion, a water-soluble solvent may be optionally used to adjust the concentration.

Before the dispersion in water with the disperser, a water-soluble organic solvent is preferably optionally further added to the dispersed product and then mixed for dilution to adjust the viscosity to be proper for the treatment by the disperser, depending on the type of the disperser to be used (the product subjected to the adjustment of viscosity is hereinafter also referred to as "viscosity-adjusted product"). In the case of using a sand mill, for example, the step is carried out as follows: the dilution is performed so that the solid concentration is from 10 to 40 mass %, the viscosity is adjusted to be from several tens to hundreds centipoise, and then the sand mill is driven for the dispersion.

After the dispersion in water in the step 2, centrifugal separation or filtration may be optionally performed.

In the present invention, an aqueous pigment dispersion in which water serves as a medium is produced owing to phase-transfer emulsification or a similar mechanism in the step 2.

Through the steps (1) and (2) in this order in the present invention, an aqueous pigment dispersion in which coarse particles have been reduced can be produced.

It is speculated that the aqueous pigment dispersion produced in this manner is in a stable state because the pigment is coated with or partially adsorbed to the block polymer P.

(Aqueous Ink-jet Recording Ink)

The aqueous pigment dispersion of the present invention is diluted to adjust the concentration to a predetermined level and can be used in a variety of applications, for example, coating of automobiles and building materials; printing inks such as offset inks, gravure inks, flexographic inks, and silk screen inks; and aqueous ink-jet recording inks. In particular, since coarse particles have been reduced in the aqueous pigment dispersion, it is particularly used as an aqueous ink-jet recording ink.

In the case where the aqueous pigment dispersion of the present invention is applied to an aqueous ink-jet recording ink, it is prepared by adding water, a binder resin, or another material thereto and optionally adding a humectant (drying inhibitor), a penetrant, or another additive to obtain the intended physical properties.

After the preparation of the ink, centrifugal separation or filtration may be optionally performed.

(Humectant)

The humectant is added to prevent the ink from being dried. The amount of the humectant used in the ink for preventing drying is preferably in the range of 3 to 50 mass %. The humectant used in the present invention is not particularly limited, but a humectant that is miscible with water and that serves to prevent the head of an ink-jet printer from being clogged is preferred. Examples of such a humectant include glycerin, ethylene glycol, diethylene glycol, triethylene glycol, polyethylene glycol having a molecular weight of 2000 or less, propylene glycol, dipropylene glycol, tripropylene glycol, 1,3-propylene glycol, isopropylene glycol, isobutylene glycol, 1,4-butanediol, 1,3-butanediol, 1,5-pentanediol, 1,6-hexanediol, meso-erythritol, and pentaerythritol; sulfolanes; lactones such as γ-butyrolactone; lactams such as N-(2-hydroxyethyl)pyrrolidone; and glycerin and derivatives thereof. In particular, use of propylene glycol or 1,3-butanediol is safe and highly effective in ink drying properties and ejection of the ink.

(Penetrant)

The penetrant is added to improve penetration of the ink to a medium subjected to recording or to adjust the diameter of a dot on the recording medium.

Examples of the penetrant include lower alcohols such as ethanol and isopropyl alcohol; ethylene oxide additives of alkyl alcohols, such as ethylene glycol hexyl ether and diethylene glycol butyl ether; and propylene oxide additives of alkyl alcohols, such as propylene glycol propyl ether.

The amount of the penetrant in the ink is preferably in the range of 0.01 to 10 mass %.

(Surfactant)

A surfactant is added to adjust the properties of the ink, such as surface tension. The surfactant that can be used for this purpose is not particularly limited, and examples thereof include a variety of anionic surfactants, nonionic surfactants, cationic surfactants, and amphoteric surfactants. Of these, anionic surfactants and nonionic surfactants are preferred.

Examples of the anionic surfactants include alkylbenzenesulfonates, alkylphenylsulfonates, alkylnaphthalenesulfonates, salts of higher fatty acids, sulfates of higher fatty acid esters, sulfonates of higher fatty acid esters, sulfates and sulfonates of higher alcohol ethers, higher alkylsulfosuccinates, polyoxyethylene alkyl ether carboxylates, polyoxyethylene alkyl ether sulfates, alkyl phosphates, and polyoxyethylene alkyl ether phosphates. Specific examples of such anionic surfactants include dodecylbenzene sulfonates, isopropylnaphthalene sulfonates, monobutylphenylphenol monosulfonates, monobutylbiphenyl sulfonates, and dibutylphenylphenol disulfonates.

Examples of the nonionic surfactants include polyoxyethylene alkyl ethers, polyoxyethylene alkylphenyl ethers, polyoxyethylene fatty acid esters, sorbitan fatty acid esters, polyoxyethylene sorbitan fatty acid esters, polyoxyethylene sorbitol fatty acid esters, glycerine fatty acid esters, polyoxyethylene glycerine fatty acid esters, polyglyceryl fatty acid esters, sucrose fatty acid esters, polyoxyethylene alkylamines, polyoxyethylene fatty acid amides, fatty acid alkylolamides, alkyl alkanolamides, acetylene glycol, oxyethylene adducts of acetylene glycol, and polyethylene glycol polypropylene glycol block copolymers. Of these, polyoxyethylene nonylphenyl ether, polyoxyethylene octylphenyl ether, polyoxyethylene dodecylphenyl ether, polyoxyethylene alkyl ethers, polyoxyethylene fatty acid esters, sorbitan fatty acid esters, polyoxyethylene sorbitan fatty acid esters, fatty acid alkylolamides, acetylene glycol, oxyethylene adducts of acetylene glycol, and polyethylene glycol polypropylene glycol block copolymers are preferred. In particular, materials having an HLB ranging from 7 to 20 have excellent dissolution stability and are thus preferred.

Examples of other surfactants that may be used include silicone-based surfactants such as polysiloxane oxyethylene adducts; fluorine-based surfactants such as perfluoroalkyl carboxylates, perfluoroalkyl sulfonates, and oxyethylene perfluoroalkyl ethers; and biosurfactants such as spicrispolic acid, rhamnolipid, and lysolecithin.

These surfactants may be used alone or in combination. In the case where a surfactant is added, the amount thereof is preferably in the range of 0.001 to 2 mass %, more preferably 0.001 to 1.5 mass %, and further preferably 0.01 to 1 mass % relative to the mass of the whole ink. At an amount of the surfactant of less than 0.001 mass %, use of the surfactant tends to give no effect; at an amount of the surfactant of greater than 2 mass %, problems such as ink bleeding are likely to be caused.

Moreover, preservatives, viscosity modifiers, pH controlling agents, chelating agents, plasticizers, antioxidants, ultraviolet absorbers, and other materials may be optionally added.

Some of the water-aqueous organic solvents used in the step 1 serve as, for example, a humectant or a penetrant. In the case where such water-soluble organic solvents are used in the step 1, they are preferably added while the amounts thereof are adjusted.

The amount of the pigment used in the aqueous ink-jet recording ink is preferably in the range of 0.1 to 20 mass % in order to give sufficient image density and to produce the dispersion stability of the pigment in the ink.

(Recording Medium)

A recording medium used together with the aqueous ink-jet recording ink is not particularly limited, and examples of usable recording media include absorbable recording media such as copying paper (PPC paper) generally used in copying machines, recording media each having a layer for absorbing ink, non-water-absorbable recording media having no ink absorbability, and less-absorbable recording media having a low ink absorbability. The aqueous ink-jet recording ink according to the present invention enables good development of color particularly in recording on recording media each having an absorber layer, non-water-absorbable recording media, and less-absorbable recording media.

Examples of the absorbable recording media include plain paper, fabric, card boards, and woods. An example of the recording media each having an absorber layer is ink-jet paper, and a specific example thereof is PICTORICO PRO PHOTOPAPER manufactured by Pictorico.

Examples of the non-water-absorbable recording media having no ink absorbability include recording media used in packaging materials of foods, and any of known plastic films can be used. Specific examples thereof include polyester films composed of polyethylene terephthalate or polyethylene naphthalate; polyolefin films composed of polyethylene or polypropylene; polyamide-based films composed of nylon; polystyrene films; polyvinyl alcohol films; polyvinyl chloride films; polycarbonate films; polyacrylonitrile films; and polylactic acid films. In particular, polyester films, polyolefin films, and polyamide films are preferably used; and polyethylene terephthalate films, polypropylene films, and nylon films are more preferably used. The above-described films may be coated with polyvinylidene chloride or another material in order to impart a barrier property. A film on which a layer composed of a metal, such as aluminum, or a metal oxide, such as silica or alumina, has been optionally formed by vapor deposition may be used in combination.

The plastic film may be an unoriented film but is preferably a uniaxially or biaxially oriented film. The surface of the film may be untreated but is preferably treated by, for example, a corona discharge treatment, an ozone treatment, a low-temperature plasma treatment, a flame treatment, or a glow discharge treatment in order to enhance adhesion. The thickness of the plastic film may be appropriately determined on the basis of applications thereof. In the case where the plastic film is used, for example, in flexible packaging, the thickness thereof is preferably from 10 μm to 100 μm, and more preferably 10 μm to 30 μm in order to impart flexibility, durability, and resistance to curling. A specific example thereof is PYLEN (registered trademark) manufactured by TOYOBO CO., LTD.

The less-absorbable recording media having a low ink absorbability can be art paper such as actually printed paper, coated paper, light coated paper, and fine coating paper. In such less-absorbable recording media, a coating material has been applied to the surface of fine paper or neutralized paper mainly composed of cellulose and generally not subjected to a surface treatment to form a coating layer. Examples thereof include fine coating paper such as "OK Everlight Coat" manufactured by Oji Paper Co., Ltd. and "AURORA S" manufactured by NIPPON PAPER INDUSTRIES CO., LTD.; light coated paper (A3) such as "OK Coat L" manufactured by Oji Paper Co., Ltd. and "AURORA L" manufactured by NIPPON PAPER INDUSTRIES CO., LTD.; coated paper (A2, B2) such as "OK Top Coat+" manufactured by Oji Paper Co., Ltd. and "AURORA COAT" manufactured by NIPPON PAPER INDUSTRIES CO., LTD.; and art paper (A1) such as "OK Kinfuji+" manufactured by Oji Paper Co., Ltd. and "TOKUBISHI ART" manufactured by Mitsubishi Paper Mills Limited.

EXAMPLES

The present invention will now be described further in detail with reference to Examples but is not limited thereto without departing from the scope of the present invention. In Examples, the terms "part" and "%" are on a mass basis unless otherwise specified.

(Measurement of Scattering Profile)

A scattering profile was measured as follows in Examples.

Step (A) for Obtaining Scattering Signal from X-Ray Scattering Experiment

Analytical Equipment: Large-scale high-brightness synchrotron radiation facility: a beam line owned by Frontier Soft Matter Beamline Consortium in SPring-8: BL03XU, second hatch Analytical Mode: Ultra-small-angle X-ray scattering (USAXS) or small-angle X-ray scattering (SAXS)

Analytical conditions: wavelength of 0.1 nm, camera length of 6 m (USAXS) or 2 m (SAXS), beam spot size of 140 μm×80 μm, no attenuator, exposure time of 30 seconds, and 2θ=0.01 to 10°

Analytical Software: Fit2D for imaging of two-dimensional data and for conversion into a one-dimensional scattering profile (software obtained from the website of European Synchrotron Radiation Facility [http://www.esrf.eu/computing/scientific/FIT2D/])

The steps (B) to (D) were performed with a software IGOR Pro manufactured by WaveMetrics and a program NIST SANS analysis package (available from National Institute of Standards and Technology).

(Preparation of Measurement Sample for Scattering Profile)

A measurement sample of the block polymer P was prepared as follows.

(1) To 0.3 g of a powder block polymer P, 0.43 g of diethylene glycol was added. Then, 1.5 g of distilled water and 0.1 mol/L of an aqueous solution of potassium hydroxide in an amount that was enough to neutralize 100% of the acid value preliminarily determined by the above-mentioned method in accordance with JIS K 0070-1992 were added thereto under stirring with heating to 80° C.

(2) The product was stirred for 2 hours while the temperature was maintained at 80° C.

(3) The resulting product was subjected to dispersion for 15 minutes with an ultrasonic washer (output: 100 W) and then stirred for 10 minutes with a conditioning mixer.

(4) To the resulting product, 1.5 g of distilled water was further added.

Then, the steps (2) and (3) were repeated five times.

The product was subsequently diluted so that the solid content was 0.5 mass % in a mixture solution having the ratio of diethylene glycol:water of 0.43:3.0, thereby obtaining a measurement sample.

(Synthesis Process 1: Synthesis of Block Polymer by Living Anionic Polymerization)

A polymerization initiator that was n-butyl lithium and a first monomer that was styrene were separately introduced from tube reactors P1 and P2 in FIG. 1 to a T-shaped micro mixer M1 in FIG. 1 for living anionic polymerization to produce a polymer.

Then, the polymer was transferred to a T-shaped micro mixer M2 in FIG. 1 through a tube reactor R1 in FIG. 1 to trap the growing terminal of the polymer with a reaction controlling agent (1,1-diphenyl ethylene) introduced from a tube reactor P3 in FIG. 1.

Then, a second monomer that was tert-butyl methacrylate was introduced from a tube reactor P4 in FIG. 1 to a T-shaped micro mixer M3, and continuous living anionic polymerization thereof with the polymer transferred trough the tube reactor R2 in FIG. 1 was performed. Then, the reaction was quenched with methanol to produce a block copolymer (PA-1).

In this process, the whole micro reactor was accommodated in a thermostatic chamber in order to adjust the reaction temperature to be 24° C. The monomers and reaction controlling agent introduced to the micro reactor were dissolved in tetrahydrofuran (THF); the n-butyl lithium was a commercially available 2.6-M hexane solution, and it was diluted with hexane; and the dilution concentration and the rate of the introduction thereof were controlled to adjust the mol ratio in the block copolymer (PA-1) to be as follows.

Mol Ratio in Block Copolymer (PA-1)

Polymerization initiator/First monomer/Reaction controlling agent/Second monomer=1.0/13.5/1.0/7.5

The block copolymer (PA-1) was treated with a cation-exchange resin to hydrolyze t-butoxycarbonyl group that was the residue of the tert-butyl methacrylate, thereby converting it to a carboxyl group. The reaction solution was distilled out under reduced pressure, and obtained solid was ground into powder of a block polymer (Ia-1).

The number average molecular weight of the block polymer (Ia-1) is shown in the below table.

In the table or another description, a block polymer produced in Synthesis Process 1 is referred to as "Ia- . . . ".

(Synthesis Process 2: Synthesis of Block Polymer by Living Radical Polymerization)

Into a 500-mL eggplant-shaped Schlenk flask in which a stirring bar had been placed, 200 g of propylene glycol monomethyl ether acetate (hereinafter referred to as "PGMEA") serving as a solvent, 16.9 g of styrene, 16 mmol of 2-cyanopropane-2-yl N-methyl-N-(pyridine-4-yl)carbamodithioate serving as an RAFT agent were put. Then, nitrogen was blown into the solution inside the flask by bubbling for a minute at 200 mL/min. The flask was placed on a hot water bath at 80° C. to increase the internal temperature of the flask to 80° C. Then, 10 minutes after the temperature reached 80° C., a solution containing 20 g of PGMEA and 4 mmol of 2,2'-azobisisobutyronitrile (AIBN) serving as a polymerization initiator was swiftly supplied to the inside of the flask, the solution was subsequently stirred for 5 hours while the temperature was maintained, and then the reaction solution was cooled to room temperature to terminate the reaction. Then, 5.61 g of styrene and 8.1 g of acrylic acid were blown into the flask, and the flask was placed on a hot water bath at 80° C. again to increase the internal temperature of the flask to 80° C. Then, 10 minutes after the temperature reached 80° C., a solution containing 20 g of PGMEA and 4 mmol of AIBN as a polymerization initiator was swiftly supplied to the inside of the flask, and the solution was subsequently stirred for 5 hours while the temperature was maintained. Then, a solution containing 20 g of PGMEA and 8 mmol of AIBN was swiftly supplied to the inside of the flask, the solution was subsequently stirred for 2 hours while the temperature was maintained, and then the reaction solution was cooled to room temperature to terminate the reaction, thereby obtaining a block polymer (Ir-1).

The number average molecular weight of the block polymer (Ir-1) is shown in the below table.

In the table or another description, a block polymer produced as in Synthesis Process 2 is referred to as "LR- . . . ".

(Synthesis Process 3: Synthesis of Random Polymer)

Into a reaction vessel having a stirrer, a dropping unit, and a reflux unit, 100 g of methyl ethyl ketone was put, and the inside of the reaction vessel was purged with nitrogen under stirring. The temperature was increased while the inside of the reaction vessel was maintained in the nitrogen atmosphere, and the inside of the reaction vessel was allowed to enter a state in which the methyl ethyl ketone was refluxed. Then, a mixture liquid of 74 parts of St, 11 parts of acrylic acid, 15 parts of methacrylic acid, and 8 parts of a polymerization initiator ("V-75" manufactured by Wako Pure Chemical Industries, Ltd.) was dropped thereinto with the dropping unit for 2 hours. Once the temperature of the reaction system reached 80° C. in the dropping, the temperature was maintained.

After the dropping, the reaction was further continued at the same temperature for 25 hours. In the middle of the reaction, consumption of the materials was checked, and the polymerization initiator was appropriately added. After the reaction, the methyl ethyl ketone was distilled off under reduced pressure, and the produced solid was ground to yield powder of a polymer (rand-1). The number average molecular weight of the polymer (rand-1) is shown in the below table.

Production Examples 1 to 10

As in any of Synthesis Processes 1 to 3, block polymers or a random polymer were produced except for changes in the types and amounts of monomers to be used. The compositions thereof are shown in the below table.

TABLE 2

| | Production Example 1 | Production Example 2 | Production Example 3 | Production Example 4 | Production Example 5 | Production Example 6 | Production Example 7 | Production Example 8 | Production Example 9 | Production Example 10 |
|---|---|---|---|---|---|---|---|---|---|---|
| Polymer name | la-1 | lr-1 | la-2 | la-3 | la-4 | la-5 | rand-1 | lr-2 | lr-3 | lr-4 |
| Synthetic process | 1 | 2 | 1 | 1 | 1 | 1 | 3 | 2 | 2 | 2 |
| Reaction temperature | 24° C. | 80° C. | 24° C. | 24° C. | 24° C. | 24° C. | 80° C. | 80PC | 80° C. | 80° C. |
| Initiator | BuLi | AIBN | BuLi | BuLi | BuLi | BuLi | V-75 | AIBN | AIBN | AIBN |
| mol ratio | 1 | — | 1 | 1 | 1 | 1 | — | — | — | — |
| First monomer | St | St | St | St | St | St | St/AA/MAA | St | St | St |
| mol ratio | 13.5 | 50 | 33.3 | 13.5 | 4 | 9 | 67.9/15.01/17.1 | 12.3 | 231.7 | 4 |
| Reaction controlling agent | DPE | — | DPE | DPE | 1 | DPE | — | — | — | — |
| mol ratio | 1 | — | 1 | 1 | | 1 | — | — | — | — |
| Second monomer | tBMA | St/AA | tBMA | tBMA/nBMA | tBMA/nBMA | tBMA | — | St/AA | St/AA | St/AA |
| mol ratio | 4.5 | 16/34 | 17.6 | 17.5/13.1 | 8.1/9.2 | 13 | — | 50.5/27.4 | 37.2/26.0 | 16.7/9.0 |
| mol ratio of first block to second block | 100:33 | 100:96 | 100:53 | 100:227 | 100:433 | 100:144 | — | 100:634 | 100:267 | 100:643 |
| MW | 2753 | 2143 | 8259 | 7564 | 4077 | 2817 | 3053 | 7032 | 6600 | 1930 |
| Mn | 2501 | 1238 | 5344 | 4760 | 2445 | 2396 | 7866 | 5543 | 4768 | 895 |
| Acid value | 147 | 160 | 140 | 146 | 146 | 193 | 180 | 181 | 178 | 180 |

(Results of Measurement of Scattering Profiles by Small- or Ultra-small-angle X-ray Scattering Using Synchrotron Radiation)

The scattering profiles of the block polymers and random polymer produced in Production Examples 1 to 10 were measured in accordance with the above-mentioned measurement of scattering profile. Table 3 and the drawings show results of the measurement.

The results show that the minimum values were present in the scattering profiles of the block polymers obtained in Production Examples 1, 2, 4, 8, and 9, in other words, these block polymers were core-shell polymer particles.

Then, 360 parts of ion exchanged water was gradually added to the kneaded product inside the vessel under stirring, and a mixture solution of 68 parts of diethylene glycol and 149 parts of ion exchanged water was added thereto. The aqueous pigment dispersion had a solid concentration of 20.2% and a pigment concentration of 15.0%.

(Evaluation)

The aqueous pigment dispersion was subjected to the following measurements for evaluations.

<Volume Average Particle Size>

Each of the aqueous pigment dispersions was diluted 5000-fold and then subjected to the measurement with

TABLE 3

| | Production Example 1 | Production Example 2 | Production Example 3 | Production Example 4 | Production Example 5 | Production Example 6 | Production Example 7 | Production Example 8 | Production Example 9 | Production Example 10 |
|---|---|---|---|---|---|---|---|---|---|---|
| Polymer name | la-1 | lr-I | la-2 | la-3 | la-4 | la-5 | rand-1 | lr-2 | lr-3 | lr-4 |
| Presence of minimum value | Yes | Yes | No | Yes | No | No | No | Yes | Yes | No |
| q | 0.2 | 0.4 | | 0.45 | | | | 0.7 | 0.7 | |
| I (q) | 450 | 70 | | 150 | | | | 76 | 50 | |

Examples: Production Process of Aqueous Pigment Dispersions

Aqueous pigment dispersions were obtained by any of the following production processes. The amounts of the materials used are shown in the below table.

The production process is described on the basis of the composition of Example 1 as an example.

Into a 0.2-L normal-pressure kneader (manufactured by Advance Co., Ltd.), 120 parts of a phthalocyanine pigment that was FASTOGEN Blue Pigment (C. I. Pigment 15:3 manufactured by DIC Corporation) and 36 parts of a polymer (P-1) were put; then, these materials were mixed with each other at a jacket temperature of 80° C. (blade-rotating rate: 40 rpm). Then, 52 parts of diethylene glycol and 15 parts of 34% aqueous solution of potassium hydroxide were added thereto, and the mixture was kneaded for an hour.

Microtrac UPA-150 (manufactured by NIKKISO CO., LTD.). The measurement was performed three times, and the average of the resulting values was employed as the measurement value.

<Number of Coarse Particles>

Each of the aqueous pigment dispersions was diluted 2000-fold and then subjected to the measurement with AccuSizer 780 APS (manufactured by International Business Corporation). The obtained number of coarse particles was converted into the number of particles per 1 ml of the aqueous pigment dispersion that had not been diluted yet. The unit of the number of particles in the table is ($\times 10^6$/ml).

In the present invention, the number of coarse particles of greater than $80 \times 10^6$/ml was defined as being unacceptable.

Results of the measurement are shown in the below table.

TABLE 4

| | Example 1 | Example 2 | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|---|
| Production Example | 1 | 1 | 1 | 1 | 1 | 1 | 1 | 1 | 1 | 1 |
| Type of pigment | PB.15:3 | PB.15:3 | PB.15:3 | PB.15:3 | PB.15:3 | PB.15:3 | PB.15:3 | PB.15:3 | PB.15:3 | PB.15:3 |
| Amount of pigment (part) | 120 | 120 | 120 | 120 | 120 | 120 | 120 | 120 | 120 | 120 |
| Type of Polymer (A) | la-1 | lr-1 | la-2 | la-3 | la-4 | la-5 | rand-1 | lr-2 | lr-3 | lr-4 |
| Amount of polymer (A) (part) | 36 | 36 | 36 | 36 | 36 | 36 | 36 | 36 | 36 | 36 |
| Acid value of pofyiner (A) | 147 | 160 | 140 | 146 | 146 | 193 | 180 | 181 | 178 | 180 |
| Volume average parade size of aqueous pigment diversion (nm) | 109 | 130 | 128 | 146 | 110 | 112 | 180 | 126 | 126 | 185 |
| Number of came parades not smaller than 1.0 μm (× $10^6$/ml) | 9 | 9 | 70 | 60 | 7 | 8 | 427 | 133 | Precipitated | 1026 |

From the results, the number of coarse particles in each of the aqueous pigment dispersions of Examples 1 and 2 was less than $80 \times 10^6$/ml. This shows that using the bloc polymer P, which had a number average molecular weight ranging from 1000 to 4000 and in which at least one minimum value in the scattering profile was present within a scattering vector q from 0.1 to 1 $nm^{-1}$, as a pigment dispersant enabled a reduction in the number of coarse particles.

In Comparative Example 1 (Ia-2 used), since a block polymer which had a number average molecular weight of greater than 4000 and in which a minimum value was not present in such a manner was used as a pigment dispersant, the number of coarse particles was greater than $80 \times 10^6$/ml. In each of Comparative Example 2 (Ia-3 used), Comparative Example 6 (Ir-2 used), Comparative Example 7 (Ir-3 used), and Comparative Example 8 (Ir-4 used), since a block polymer which had a number average molecular weight of greater than 4000 or a block polymer in which a minimum value was not present in the above-mentioned manner was used as a pigment dispersant, the number of coarse particles was greater than $80 \times 10^6$/ml.

In Comparative Example 5 (rand-1 used), since a random polymer was used as a pigment dispersant, the number of coarse particles was greater than $80 \times 10^6$/ml.

<Degree of Strike-Through>

Each of the aqueous pigment dispersions was diluted with ion exchanged water to a solid concentration of 5 mass % to produce a sample. The sample was applied to plain paper with a No. 26 bar coater, and the sample-applied surface and back surface thereof were subjected to measurement of a* and b* with a colorimeter (Spectro Eye manufactured by GRETAG MACBETH AG); furthermore, 5 μL of the sample was applied to a coated paper and air-dried at room temperature, and the sample-applied surface and back surface thereof were subjected to the same measurement.

The degree of strike-through was evaluated on the basis of chroma C* (colorfulness). Chroma C* is defined in accordance with JIS Z8781-4 and represented by Equation (C1).

[Math. 11]

$$C^* = (a^{*2} + b^{*2})^{0.5} \tag{C1}$$

On the basis of this equation, the chroma difference ΔC* in sample-non-applied part was calculated from Equation (2), and the result was defined as the degree of strike-though. The larger ΔC*, the more the degree of strike-through.

[Math. 12]

$$\Delta C^* = \sqrt{(a_{sample}^* - a_{paper}^*)^2 + (b_{sample}^* - b_{paper}^*)^2} \tag{C2}$$

The subscript "sample" refers to the a* and b* of the back surface of the sample-applied part, and the subscript "paper" refers to the a* and b* of the sample-non-applied part.

The measurement of a* and b* was carried out five times for one sample, and the average of the resulting values was used to calculate ΔC*.

Tables 5 and 6 show results of the measurement.

TABLE 5

| Results in plain paper | $a^*_{sample}$ | $b^*_{sample}$ | ΔC* |
|---|---|---|---|
| Aqueous pigment dispersion of Example 1 (1a-1) | −0.9 | −4.4 | 13.2 |
| Aqueous pigment dispersion of Comparative Example 4 (1a-5) | −1.9 | −12.5 | 21.2 |
| Aqueous pigment dispersion of Comparative Example 3 (1a-4) | −2.4 | −14.2 | 23.3 |

TABLE 6

| Results in coated paper | $a^*_{sample}$ | $b^*_{sample}$ | ΔC* |
|---|---|---|---|
| Aqueous pigment dispersion of Example 1 (1a-1) | −2.1 | −1.9 | 2.8 |

TABLE 6-continued

| Results in coated paper | $a^*_{sample}$ | $b^*_{sample}$ | $\Delta C^*$ |
|---|---|---|---|
| Aqueous pigment dispersion of Comparative Example 4 (Ia-5) | −7.5 | −7.9 | 10.9 |
| Aqueous pigment dispersion of Comparative Example 3 (Ia-4) | −11.6 | −7.9 | 14.0 |

The results show that the aqueous pigment dispersion of Example 1 applied to both plain paper and coated paper had a small $\Delta C^*$, in other words, it was less likely to suffer from strike-though. In each of the aqueous pigment dispersions of Comparative Example 3 (Ia-4 used) and Comparative Example 4 (Ia-5 used), a block polymer P which had a number average molecular weight ranging from 1000 to 4000 and in which a minimum value was not present in the above-mentioned manner was used, and it is therefore likely to suffer from strike-though.

BRIEF DESCRIPTION OF DRAWINGS

FIG. 1 is a schematic view illustrating a micro reactor used in Examples.
FIG. 2 illustrates the measured scattering profile of the polymer Ia-1 of Production Example 1.
FIG. 3 illustrates the measured scattering profile of the polymer Ir-1 of Production Example 2.
FIG. 4 illustrates the measured scattering profile of the polymer Ia-2 of Production Example 3.
FIG. 5 illustrates the measured scattering profile of the polymer Ia-3 of Production Example 4.
FIG. 6 illustrates the measured scattering profile of the polymer Ia-4 of Production Example 5.
FIG. 7 illustrates the measured scattering profile of the polymer Ia-5 of Production Example 6.
FIG. 8 illustrates the measured scattering profile of the polymer rand-1 of Production Example 7.
FIG. 9 illustrates the measured scattering profile of the polymer Ir-2 of Production Example 8.
FIG. 10 illustrates the measured scattering profile of the polymer Ir-3 of Production Example 9.
FIG. 11 illustrates the measured scattering profile of the polymer Ir-4 of Production Example 10.

REFERENCE SIGNS LIST

1 T-shaped micro mixer M1
2 T-shaped micro mixer M2
3 T-shaped micro mixer M3
4 Tube reactor R1
5 Tube reactor R2
6 Tube reactor R3
7 Tube reactor P1 for precooling
8 Tube reactor P2 for precooling
9 Tube reactor P3 for precooling
10 Tube reactor P4 for precooling

The invention claimed is:
1. A pigment dispersant that is a block polymer P in which a hydrophobic polymer block A and a hydrophilic polymer block B containing an anionic group are linked to each other, the block polymer P is represented by General Formula (1),

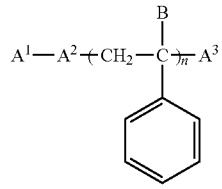

wherein $A^1$ represents the residue of an organolithium initiator,
$A^2$ represents the polymer block A containing an aromatic ring selected from the group consisting of styrene, p-tert-butyldimethyl siloxystyrene, o-methylstyrene, p-methylstyrene, p-tert-butylstyrene, p-tert-butoxystyrene, m-tert-butoxystyrene, p-tert-(1-ethoxymethyl)styrene, m-chlorostyrene, p-chlorostyrene, p-fluorostyrene, α-methylstyrene, p-methyl-α-methylstyrene, vinylnaphthalene, and vinylanthracene,
$A^3$ represents the polymer block B containing an anionic group, n is an integer from 1 to 5, and B represents an aromatic group or an alkyl group,
wherein the block polymer P has a number average molecular weight ranging from 1000 to 4000 and has an acid value from 40 to 400 mgKOH/g;
in the case where the block polymer P is subjected to 100% neutralization with a basic compound and dispersed in water and where the fine particles of the dispersed block polymer P are subjected to measurement of a scattering profile by small- or ultra-small-angle X-ray scattering that involves use of synchrotron radiation, at least one minimum value in the scattering profile is present within the range of a scattering vector q from 0.1 to 1 $nm^{-1}$, and
wherein a molar ratio A:B of the polymer block A to the polymer block B is from 100:10 to 100:96.
2. The pigment dispersant according to claim 1, wherein the block polymer P has an acid value from 40 to 190 mgKOH/g.
3. The pigment dispersant according to claim 1, wherein a number of the anionic groups contained in the polymer block B is from 3 to 20.
4. The pigment dispersant according to claim 1, wherein the organolithium initiator is selected from the group consisting of methyllithium, ethyllithium, propyllithium, n-butyllithium, sec-butyllithium, iso-butyllithium, tert-butyllithium, pentyllithium, hexyllithium, methoxymethyllithium, ethoxymethyllithium, benzyllithium, α-methylstyryllithium, 1,1-diphenyl-3-methylpentyllithium, 1,1-diphenylhexyllithium, phenylethyllithium, vinyllithium, allyllithium, propenyllithium, butenyllithium, ethynyllithium, butynyllithium, pentynyllithium, hexynyllithium, phenyllithium naphthyllithium, 2-thienyllithium, 4-pyridyllithium, 2-quinolyllithium, tri(n-butyl)magnesium lithium and trimethyl magnesium lithium.
5. The pigment dispersant according to claim 1, wherein the anionic group in $A^3$ is selected from the group consisting of a carboxyl group, a sulfonate group, and a phosphate group.
6. The pigment dispersant according to claim 1, wherein a molar ratio A:B of the polymer block A to the polymer block B is from 100:33 to 100:96.
7. An aqueous pigment dispersion comprising the pigment dispersant according to claim 1, a pigment, a basic compound, and an aqueous medium.

8. Core-shell polymer particles comprising a block polymer P in which a hydrophobic polymer block A and a hydrophilic polymer block B containing an anionic group are linked to each other, the block polymer P is represented by General Formula (1);

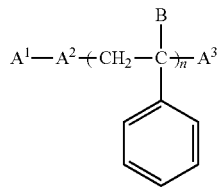

wherein $A^1$ represents the residue of an organolithium initiator, $A^2$ represents the polymer block A containing an aromatic ring selected from the group consisting of styrene, p-tert-butyldimethyl siloxystyrene, o-methylstyrene, p-methylstyrene, p-tert-butylstyrene, p-tert-butoxystyrene, m-tert-butoxystyrene, p-tert-(1-ethoxymethyl) styrene, m-chlorostyrene, p-chlorostyrene, p-fluorostyrene, α-methylstyrene, p-methyl-α-methylstyrene, vinylnaphthalene, and vinylanthracene, $A^3$ represents the polymer block B containing an anionic group, n is an integer from 1 to 5, and B represents an aromatic group or an alkyl group, wherein the block polymer P has a number average molecular weight ranging from 1000 to 4000; and in the case where the block polymer P is subjected to measurement of a scattering profile by small- or ultra-small-angle X-ray scattering that involves use of synchrotron radiation, at least one minimum value in the scattering profile is present within the range of a scattering vector q from 0.1 to 1 $nm^{-1}$.

* * * * *